US012695110B2

(12) United States Patent
    Bayat

(10) Patent No.: US 12,695,110 B2
(45) Date of Patent: Jul. 28, 2026

(54) BATTERY ASSEMBLY SYSTEMS AND METHODS

(71) Applicant: Rivian IP Holdings, LLC, Plymouth, MI (US)

(72) Inventor: Daniel Bayat, Reno, NV (US)

(73) Assignee: Rivian IP Holdings, LLC, Irvine, CA (US)

( * ) Notice: Subject to any disclaimer, the term of this patent is extended or adjusted under 35 U.S.C. 154(b) by 827 days.

(21) Appl. No.: 18/047,044

(22) Filed: Oct. 17, 2022

(65) Prior Publication Data

US 2024/0128488 A1     Apr. 18, 2024

(51) Int. Cl.
    *H01M 10/04*     (2006.01)
(52) U.S. Cl.
    CPC ..... *H01M 10/0404* (2013.01); *H01M 10/049* (2013.01)
(58) Field of Classification Search
    CPC . H01M 10/0404; H01M 10/049; Y02P 70/50; Y02E 60/10
    See application file for complete search history.

(56) References Cited

U.S. PATENT DOCUMENTS

2012/0148913 A1 * 6/2012 Chiba ................... H01M 50/54
                                                                29/730

FOREIGN PATENT DOCUMENTS

KR          101309132 B1 * 9/2013 .......... H01M 50/256
KR      20220102241 A * 7/2022 ........ H01M 10/0459

* cited by examiner

*Primary Examiner* — Ula C Ruddock
*Assistant Examiner* — Sydney L Kline
(74) *Attorney, Agent, or Firm* — Foley & Lardner LLP

(57) ABSTRACT

A system to assemble a battery cell can include a first conveyor mechanism and a second conveyor mechanism. The first conveyor mechanism can move an electrode layer stack and a cap in a first direction. The electrode layer stack can abut the cap and extend from the cap in a second direction. The second conveyor mechanism can include a screw. The second conveyor mechanism can receive a housing, rotate the housing about the screw, and provide the housing over the electrode layer stack.

20 Claims, 13 Drawing Sheets

Welding
Device

1100

| | |
|---|---|
| Provide Electrode Layer Stack | ~1105 |
| Provide Housing | ~1110 |
| Move Electrode Layer Stack | ~1115 |
| Move Housing | ~1120 |
| Cover Electrode Layer Stack | ~1125 |
| Secure Housing | ~1130 |
| Weld Housing | ~1135 |

1200

Provide System — 1205

1300

Provide Battery Cell                                        1305

BATTERY ASSEMBLY SYSTEMS AND METHODS

INTRODUCTION

Vehicles can use electricity to power a motor. Electricity can be provided by a battery to operate the vehicle or components thereof.

SUMMARY

Systems and methods for manufacturing a battery cell can assemble a battery cell in a continuous or uninterrupted fashion to increase manufacturing throughput and reduce manufacturing time. The systems and methods can insert a battery electrode layer stack (e.g., a jelly roll) into a cavity of a battery cell housing (e.g., a prismatic can, a cylindrical can, or a can having some other form factor) via a first conveyor mechanism and a second conveyor mechanism. The first conveyor mechanism can move the electrode layer stack and a cap structured to couple with the housing in a first direction, where the electrode layer stack is positioned on or adjacent the cap. The first conveyor mechanism can be or include a screw conveyor mechanism that translates the electrode layer stack and the cap via rotation of a screw. The second conveyor mechanism can be or include a screw structured to translate a housing along a helical path around the screw. For example, the screw of the second conveyor mechanism can receive a housing and can rotate the housing about the screw as the screw rotates. The second conveyor mechanism can rotate the housing about the screw to provide the housing to the electrode layer stack and cap as the first conveyor mechanism moves the electrode layer stack and cap. The first conveyor mechanism and the second conveyor mechanism can move the electrode layer stack and the housing at a substantially similar (e.g., ±95% similar) rate. The second conveyor mechanism can provide the housing to the electrode layer stack and the cap with a force, where the force can secure the cap to the housing. The first conveyor mechanism and second conveyor mechanism can respectively receive and move multiple electrode layer stacks and housing at an interval to assemble a battery cell at the interval.

At least one aspect is directed to a system. The system can include a first conveyor mechanism and a second conveyor mechanism. The first conveyor mechanism can move an electrode layer stack and a cap in a first direction. The electrode layer stack can abut the cap and extend from the cap in a second direction. The second conveyor mechanism can include a screw. The second conveyor mechanism can receive a housing, rotate the housing about the screw, and provide the housing over the electrode layer stack.

At least one aspect is directed to a method. The method can include moving, via a first conveyor mechanism, an electrode layer stack and a cap in a first direction. The electrode layer stack can extend from the cap in a second direction. The method can include moving, via a second conveyor mechanism, a housing from a first position to a second position. The housing can include a cavity extending from an open end. The method can include securing, via the second conveyor mechanism, the open end to the cap with the electrode layer stack within the cavity and with cavity extending from the open end in the second direction.

At least one aspect is directed to an electric vehicle. The electric vehicle can include a battery cell including an electrode layer stack within a housing. The battery cell can be produced by moving, via a first conveyor mechanism, the electrode layer stack and a cap in a first direction. The electrode layer stack can extend from the cap in a second direction. The battery cell can be produced by moving, via a second conveyor mechanism, the housing from a first position to a second position. The housing can include a cavity extending from an open end. The battery cell can be produced by securing, via the second conveyor mechanism, the open end to the cap with the electrode layer stack within the cavity and with cavity extending from the open end in the second direction.

At least one aspect is directed to a method. The method can include providing a system. The system can include a first conveyor mechanism and a second conveyor mechanism. The first conveyor mechanism can move an electrode layer stack and a cap in a first direction. The electrode layer stack can abut the cap and can extending from the cap in a second direction. The second conveyor mechanism can include a screw. The second conveyor mechanism can receive a housing, rotate the housing about the screw, and provide the housing over the electrode layer stack.

At least one aspect is directed to a method. The method can include providing a battery cell. The battery cell can include an electrode layer stack and a housing. The battery cell can be produced by moving, via a first conveyor mechanism, the electrode layer stack and a cap in a first direction. The electrode layer stack can extend from the cap in a second direction. The battery cell can be produced by moving, via a second conveyor mechanism, a housing from a first position to a second position. The housing including a cavity extending from an open end. The battery cell can be produced by securing, via the second conveyor mechanism, the open end to the cap with the electrode layer stack within the cavity and with cavity extending from the open end in the second direction.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
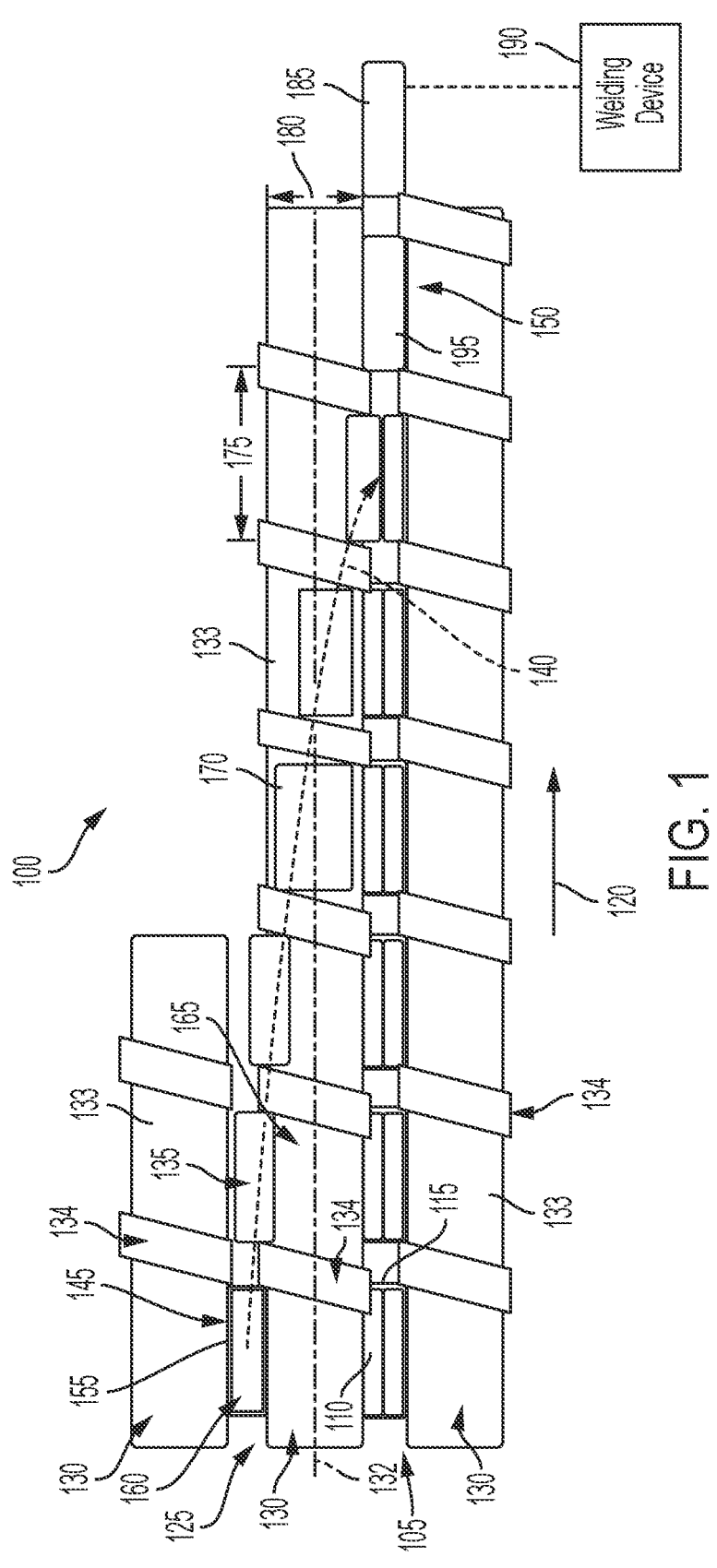
FIG. 1 depicts an example system for manufacturing a battery cell, in accordance with some aspects.

Following below are more detailed descriptions of various concepts related to, and implementations of, methods, apparatuses, and systems of manufacturing a battery cell. The various concepts introduced above and discussed in greater detail below may be implemented in any of numerous ways.

The present disclosure is directed to systems and methods of manufacturing a battery. More particularly, the present disclosure is directed to systems and methods of inserting a stack of battery electrode layers (e.g., a jelly roll) into a battery cell housing (e.g., a can). The systems and methods can receive a jelly roll, a can, and a cap for the can on a screw-drive conveyance system, and can insert the electrode layer stack into the can and secure the cover to the can. The systems and methods can insert electrode layer stack into a housing in an uninterrupted and continuous fashion.

The disclosed solutions have a technical advantage of inserting jelly rolls into housings and securing caps to housings in an uninterrupted manner to produce battery electrode cells at a rapid rate. The system and methods can operate in a continuous fashion with minimal downtime. For example, the system can receive electrode layer stack and a cap on a first conveyor mechanism. The cap can be structured to securely receive a housing based on an applied force (e.g., 1-20 kg force). The electrode layer stack and the cap can move in unison in a first direction at a first rate along the first conveyor mechanism. The first conveyor mechanism can include a linear conveyor surface or a screw type conveyor that moves the electrode layer stack and cap. The first conveyor mechanism can include a timing screw to space apart one jelly roll and cap from a subsequent jelly roll and cap. The electrode layer stack can be or include a plurality of stacked electrode layers (e.g., 10 layers, 20 layers, 100 layers, or some other number). The electrode layer stack can be positioned adjacent (e.g., abutting, on top of, beneath, next to) the cap and can extend in a second direction. The electrode layer stack can be oriented such that the electrode layers of the stack are parallel, perpendicular, or at some other angle with respect to an inner surface of the cap.

The system can include a second conveyor mechanism. The second conveyor system can receive a housing (e.g., can, case). The second conveyor system can move the housing from a first positon to a second position. The second conveyor system can move the housing in the first direction at the first rate. The second conveyor mechanism can be a screw-type conveyor including a helical structure (e.g., a screw having helical threading), and can rotate the housing about the screw along a helical path as the housing moves in the first direction. The second conveyor mechanism can be or include a timing screw to space apart one housing from a subsequent housing. The second conveyor mechanism can include at least one guide to direct the movement of the housing about the screw. For example, the second conveyor mechanism can move the housing along the helical path extending in the first direction, where the housing moves between the screw and the guide. As the housing translates along the helical path, the second conveyor mechanism can rotate the housing towards the first conveyor mechanism. The second conveyor mechanism and the first conveyor mechanism can be timed (e.g., proceeding at the same first rate) such that an open end of the housing can receive the electrode layers as the housing is rotated from the first position to the second position while first conveyor mechanism and the second conveyor mechanism move in the first direction. A velocity of the housing as it moves with the second conveyor mechanism can apply a force to secure the housing to the cap with the electrode layers inserted into a cavity of the housing via the open end. The housing can be secured to the cap via another force applied by an actuator or other device. Once the housing receives the electrode layers, the housing can translate in the second direction with the electrode layers and cap along the first conveyor mechanism. The housing can be welded to the cap to finally secure the housing with the cap.

Figure 2:
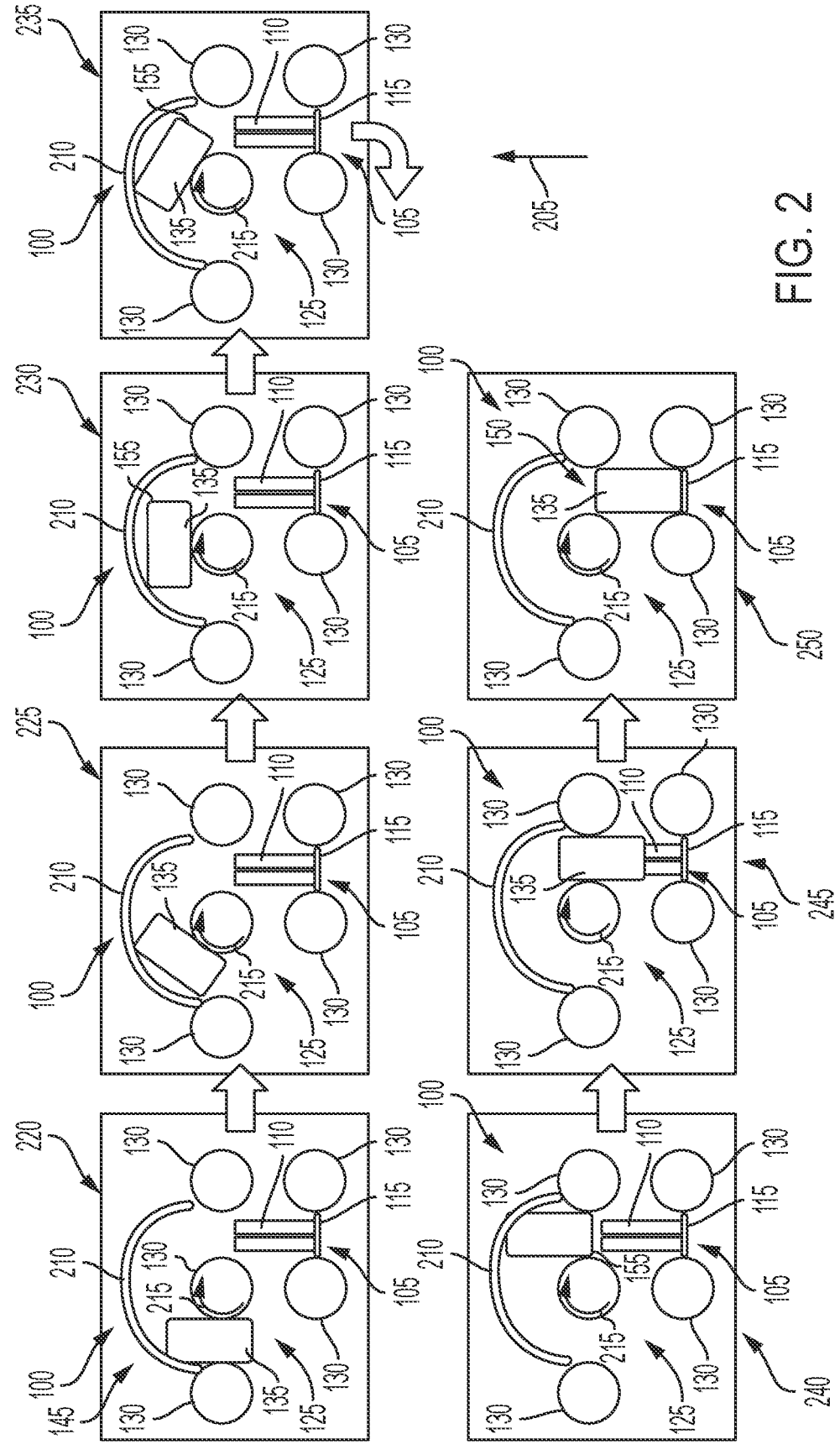
FIG. 2 depicts an example system for manufacturing a battery cell, in accordance with some aspects.
Figure 3:
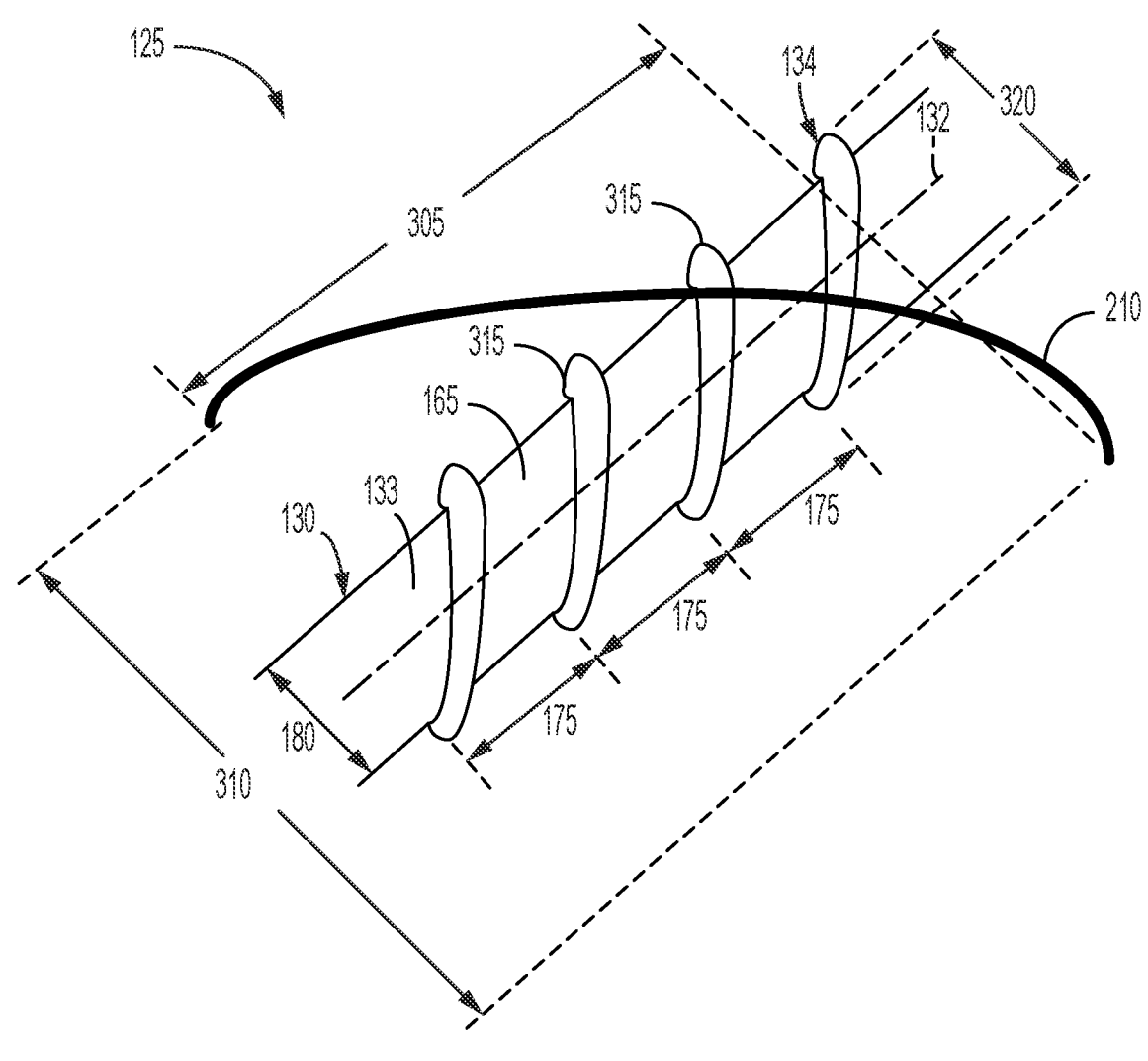
FIG. 3 depicts an example conveyor mechanism of a system for manufacturing a battery cell, in accordance with some aspects.

FIGS. 1-3, among others, depict a system 100 for manufacturing a battery cell. For example, the system 100 can assemble a battery cell by providing a housing 135 to an electrode layer stack 110 (e.g., a jelly roll) and a cap 115 (e.g., a battery cell housing cap). In other embodiments, a housing 135 can be an assembly of a plurality of structural members. For example, the housing 135 can include a hollow can, a faceplate, a sidewall, a ring, a cap, or another rigid or flexible member that can be assembled to form the housing 135. The housing 135 can protect the electrode layer stack 110 from damage (e.g., surface defects, blemishes, rips, tears, occlusions, or other defects introduced by collision of the electrode layer stack 110 with some other object). The cap 115 can be a faceplate that is coupled with the housing 135, where the housing 135 is a hollow can. The housing 135 can be a structural ring coupled with a first faceplate, where the cap 115 can be a second faceplate. The housing 135 can be an assembly of at least one sidewall, at least one faceplate, at least one ring, at least one hollow structure, or other components. In other examples, the housing 135 can be a hollow can that can receive the cap 115. The system 100 can include a first conveyor mechanism 105. For example, the first conveyor mechanism 105 can move the electrode layer stack 110 and the cap 115 in the first direction 120. The first conveyor mechanism 105 can move the electrode layer stack 110 and the cap 115 within a horizontal plane extending in the first direction 120. For example, the first conveyor mechanism 105 can translate the electrode layer stack 110 and the cap 115 in the first direction 120 in a precise and controlled manner so as to minimize (e.g., reduce by 98%) any movement of the electrode layer stack 110 or the cap 115 in a direction other than the direction 120.

Figure 4:
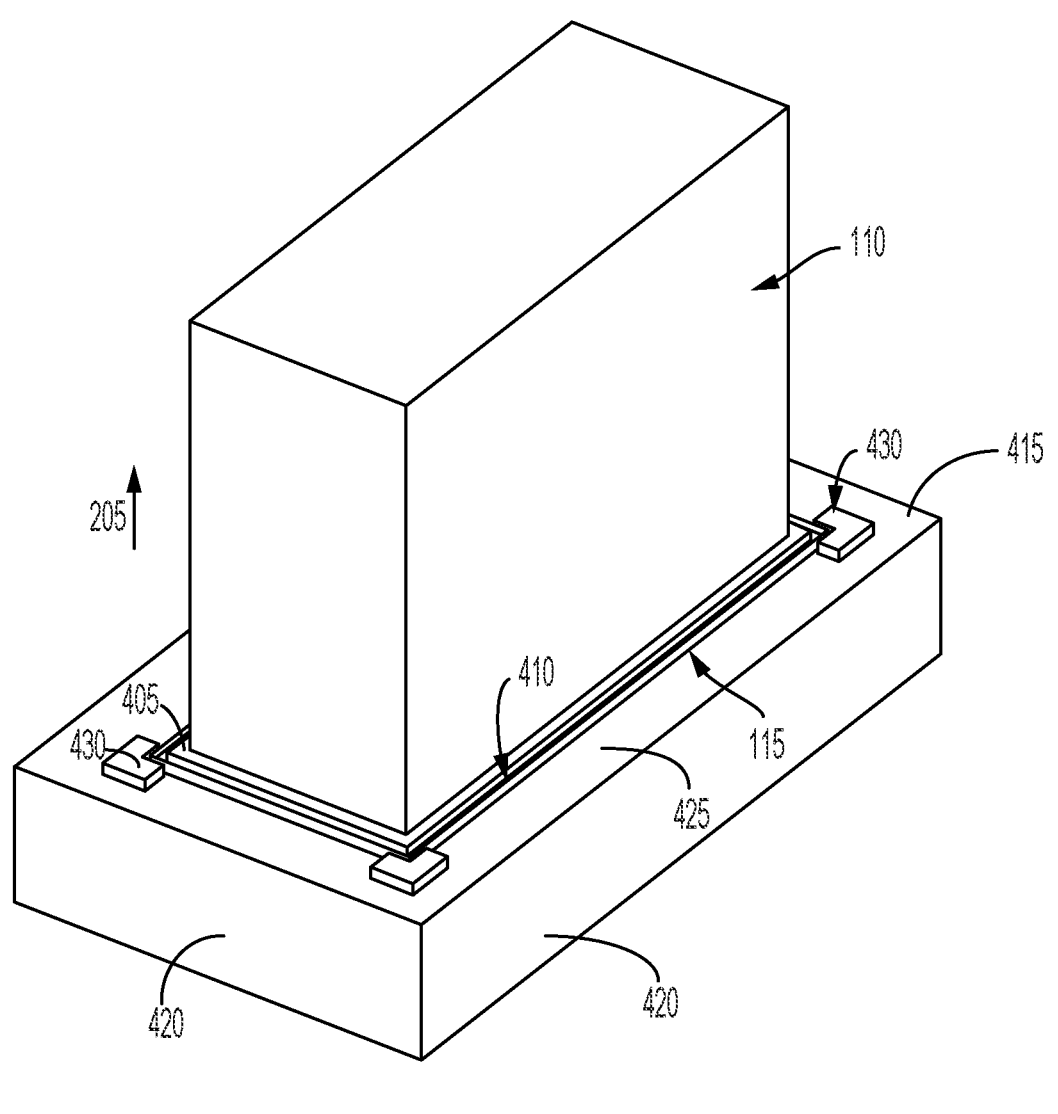
FIG. 4 depicts an example electrode layer stack and battery cell housing cap, in accordance with some aspects.

The system 100 can include the first conveyor mechanism 105 to receive the electrode layer stack 110 and the cap 115. For example, the first conveyor mechanism 105 can receive the electrode layer stack 110 and cap 115 simultaneously. The electrode layer stack 110 can abut (e.g., be adjacent to, be positioned against, contact) the cap 115. For example, the electrode layer stack 110 can be positioned against and can extend from an inner surface 405 of the cap 115, as depicted in FIG. 4, among others. The cap 115 can include the inner surface 405 having a dimension (e.g., length, width, or other dimension) that is larger than a dimension of the electrode layer stack 110 (e.g., length, width, or other dimension). For example, the electrode layer stack 110 can be substantially centered (e.g., ±25%) on the inner surface 405 of the cap 115 such that a distance exists between an edge of the electrode layer stack 110 and an edge of the cap 115.

The electrode layer stack 110 and the cap 115 can be provided to the first conveyor mechanism 105 by a substrate conveyor (e.g., conveyor belt), pick-and-place robot arm, a screw conveyor mechanism, or some other conveyance means. The first conveyor mechanism 105 can receive multiple electrode layer stacks 110 and multiple caps 115. For example, the first conveyor mechanism 105 can receive an electrode layer stack 110 extending from the cap 115 at a regular interval (e.g., every two seconds, every five seconds, every ten seconds, or some other interval). The first conveyor mechanism 105 can receive electrode layer stacks 110 and caps 115 at a regular interval using a timing screw conveyor mechanism. For example, the timing screw conveyor mechanism can include a tapered screw that accepts (e.g., draws from a queue) a single electrode layer stack 110 and cap 115 with the electrode layer stack 110 extending from the cap 115 at some interval as defined by the tapered screw pitch length and the rotational speed of the tapered screw.

The system 100 can include the electrode layer stack 110 abutting the cap 115 and extending from the cap 115 in a second direction 205. For example, the electrode layer stack 110 can be positioned on the inner surface 405 of the cap 115 and can extend for a length in the second direction 205. The second direction can be substantially vertical (e.g., ±30 degrees from vertical) such that the electrode layer stack 110 can rest on the inner surface 405 of the cap 115 via gravitational force. The cap 115 can be positioned horizontally such that the inner surface 405 of the cap 115 is perpendicular to a vertical direction (e.g., the second direction 205). The inner surface of the cap 115 can rest within a plane that is parallel with a plane including the first direction 120. The electrode layer stack 110 can directly abut (e.g., directly contact, directly touch) the cap 115. The electrode layer stack 110 can be spaced apart from the cap 115. For example, a material (e.g., an electrolyte layer, electrolyte liquid, or projection from the inner surface 405 of the cap 115, or other object) can be positioned between the electrode layer stack 110 and the cap 115.

The system 100 can include the first conveyor mechanism 105 including a fixture 415. For example, the system 100 can include the fixture 415 to receive the cap 115 and the electrode layer stack 110. The cap 115 (and the electrode layer stack 110 which can be can be positioned on and extend from the cap 115) can be positioned on the fixture 415. Instead of directly contacting the cap 115 to move the cap 115 and electrode layer stack 110 in the first direction 120, the first conveyor mechanism 105 can contact the fixture 415. For example, the electrode layer stack 110 and the cap 115 can be positioned on a surface 425 of the fixture 415. The fixture 415 can include at least one side 420. For example, the fixture 415 can include a generally parallelepiped shape including four sides 420, a bottom (not shown), and the surface 425. The fixture 415 can include a dimension (e.g., length, width, or some other dimension) that is larger than a dimension (e.g., length, width, or some other dimension) of the cap 115 or a dimension (e.g., length, width, or some other dimension) of the electrode layer stack 110. For example, a distance can exist between an edge of the cap 115 and the sides 420 of the fixture 415 with the cap 115 and electrode layer stack 110 positioned on the fixture 415. The fixture 415 can include at least one positioning device 430. For example, the fixture 415 can include multiple positioning devices 430 positioned on the surface 425 of the fixture 415 and structured to locate a corner of the cap 115. The positioning device 430 can contact the cap 115 to locate an edge of the cap 115 and control a position of the cap 115. For example, the cap 115 can be received on the fixture 415 in a position that is determined (e.g., controlled, constrained, fixed, or otherwise influenced) by the positioning devices 430. As depicted in FIG. 4, among others, the fixture 415 can include a positioning device 430 to locate at least one corner of the cap 115 in order to constrain the position of the cap 115 on the surface 425 of the fixture 415. By constraining the position of the cap 115 on the surface 425 of the fixture 415, the fixture 415 can precisely control (e.g., within ±1-5 mm tolerance) the position of the cap 115 and electrode layer stack 110.

The system 100 can include the first conveyor mechanism 105 including the fixture 415 to move the electrode layer stack 110 and the cap 115 in the first direction 120. For example, the electrode layer stack 110 and the cap 115 can be positioned on the surface 425 of the fixture 415 as the first conveyor mechanism 105 moves the fixture 415 in the first direction. The first conveyor mechanism 105 can contact a side 420 of the fixture 415 to move the fixture 415 in the first direction 120. The first conveyor mechanism 105 can contact a bottom (not shown) of the fixture 415 to move the fixture in the first direction 120. The electrode layer stack 110 can be positioned on the inner surface 405 of the cap 115 and can extend from the inner surface 405 of the cap 115 as the fixture 415 moves the cap 115 in the first direction 120. A position of the cap 115 and the electrode layer stack 110 relative to the surface 425 can be constrained by at least one positioning device 430 of the fixture 415 as the fixture 415 moves in the first direction 120. For example, the positioning device 430 of the fixture 415 can prevent the cap 115 and the electrode layer stack 110 from moving relative to the fixture 415 as the fixture 415 is moved by the first conveyor mechanism 105.

Figure 5:
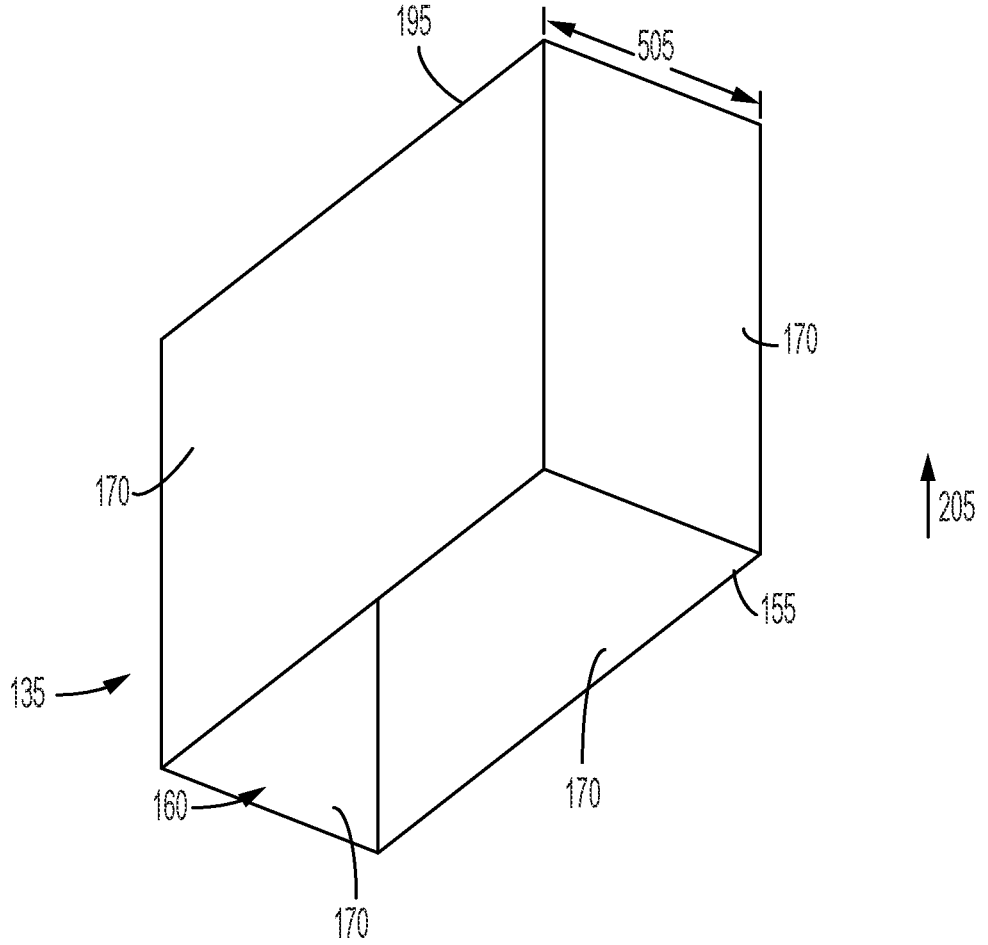
FIG. 5 depicts an example battery cell housing, in accordance with some aspects.

The system 100 can include the second conveyor mechanism 125 to receive a housing 135. The housing 135 can include a cavity 160. For example, the housing 135 can include an open end 155. The cavity 160 can extend from the open end 155. The housing 135 can be a parallelepiped, open-top structure. For example, as depicted in FIG. 5, among others, the housing 135 can include a closed end 195, four walls 170, and an open end 155. The open end 155 can provide access to the cavity 160. The walls 170 can be thin relative to the cavity 160. For example, the cavity 160 can occupy a substantial portion (e.g., 80%) of the volume of the housing 135 as defined by the walls 170, the closed end 195, and the open end 155. The cavity 160 can include a form factor that is similar to or different than the form factor of the housing 135 as defined by the walls 170, the closed end 195, and the open end 155. For example, as depicted in FIG. 5, among others, the housing 135 can include a generally rectangular form factor. The cavity 160 can include a generally rectangular form factor. The cavity 160 can include a different form factor, such as ovular, rectangular with rounded corners, or some other shape.

Figure 9:
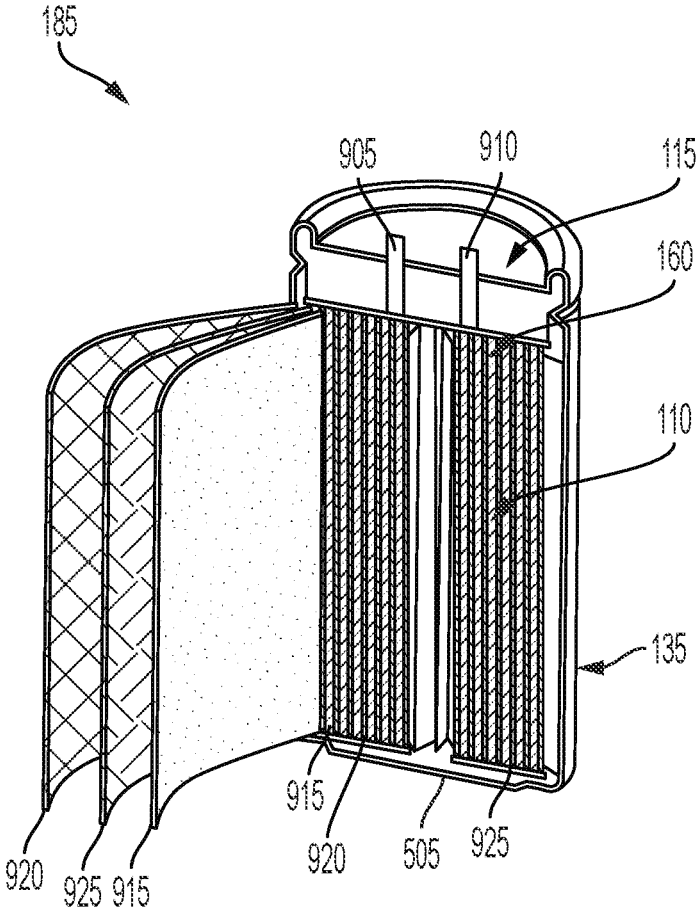
FIG. 9 depicts a cross sectional view of an example battery cell, in accordance with some aspects.

The housing 135 can include a form factor that is non-rectangular. For example, as depicted in FIG. 9, the housing 135 can include a generally cylindrical form factor. The cylindrical housing 135 can include a wall 170, a closed end 195, and an open end 155. The cylindrical housing 135 can receive a cylindrical electrode layer stack 110 (e.g., jelly roll). For example, the cavity 160 of the cylindrical housing 135 can receive a rolled electrode layer stack 110 that includes a cylindrical form factor as shown in FIG. 9, among others. The housing 135 can include form factors other than parallelepiped or cylindrical, such as pentagonal, ovular, hexagonal, octagonal, trapezoidal, or some other shape. Regardless of the form factor of the housing 135, the cavity 160 defined by the housing 135 can be different or similar to the form factor of the housing 135.

The cavity 160 of the housing 135 can receive the electrode layer stack 110. For example, the electrode layer stack 110 can be inserted into the cavity 160 of the housing 135 to assemble the battery cell 185. The cap 115 can be secured to the open end 155 of the housing with the electrode layer stack 110 extending into the cavity 160 to assemble the battery cell 185. For example, the electrode layer stack 110 can extend from the inner surface 405 of the cap 115 in the second direction 205. The housing 135 can be oriented with the cavity 160 extending from the open end 155 in the second direction 205. The electrode layer stack 110 can include a form factor or dimensions that correspond with a form factor or dimension of the cavity 160 of the housing 135. For example, the electrode layer stack 110 can include a width that corresponds to a width of the cavity 160 defined by the housing 135. The electrode layer stack 110 can include a dimension (e.g., length, width, height) that is slightly less than (e.g., 1-10% less than) a dimension (e.g., length, width, height) of the cavity 160. The electrode layer stack 110 can be inserted into the cavity 160 of the housing 135 without the electrode layer stack 110 contacting a wall 170 of the housing 135 from within the cavity 160. Regardless of the form factor of the housing 135, the cavity 160 can receive an electrode layer stack 110.

The open end 155 of the housing 135 can correspond with the cap 115. For example, the open end 155 of the housing 135 can include an interfacing mechanism (e.g., a lip, a groove, a flange, at least one protrusion, aperture, or other coupling means) that can correspond with an interfacing mechanism 410 (e.g., groove, lip, flange, aperture, protrusion, or other coupling means) on the inner surface 405 of the cap 115. The cap 115 can correspond with the open end 155 of the housing 135 to couple (e.g., secure, affix, mount, interlock) the cap 115 with the housing 135. For example, as shown in FIG. 4 among others, the cap 115 can include an interfacing mechanism 410 embodied as a perimetral groove. The interfacing mechanism 410 can receive a perimetral lip or flange of the open end 155 of the housing 135 to couple the housing 135 with the cap 115. The cap 115 can include the interfacing mechanism 410 embodied as at least one aperture that corresponds with (e.g., receives) at least one protrusion of the open end 155 of the housing 135 to couple the housing 135 with the cap 115. The cap 115 can be secured to the open end 155 of the housing 135 with sufficient force (e.g., 1 lb force, 1 kg force, 10 lbs force, or some other force). Regardless of the form factor of the housing 135, the open end 155 can mate with (e.g., be secured to, interface with, correspond with, contact) a cap 115, where the cap 115 can include an interface (e.g., a groove, a protrusion, or other coupling means) that can interface with the open end 155 of the housing 135.

The cap 115 can be positioned at the open end 155 of the housing 135 such that the cap 115 can be secured to the housing 135. For example, the cap 115 can be a faceplate or similar structure that is coupled with another component of the housing 135 (e.g., a ring, another faceplate, a sidewall, a hollow can, or other structure) to enclose the electrode layer stack 110 within the cavity 160. In such examples, the cap 115 can be secured to the housing 135 (or a component thereof) by some means other than application of force (e.g., a force of the housing 135 onto the cap 115). For example, the cap 115 can be secured to the housing 135 via fasteners (e.g., a screw, a bolt, a clamp, or other fastener), adhesive (e.g., glue, resin, or other adhesive), or via a welding operation.

The system 100 can include the second conveyor mechanism 125 to receive the housing 135 in a first orientation. For example, the second conveyor mechanism 125 can receive the housing 135 with the cavity 160 extending from the open end 155 in some direction other than the second direction 205. The cavity 160 can extend from the open end 155 in a direction that is opposite the second direction 205. The cavity 160 can extend from the open end 155 in some other direction (e.g., 45 degrees from the second direction 205, 90 degrees from the second direction 205, or some other orientation). The second conveyor mechanism 125 can receive the housing 135 via a substrate conveyor (e.g., a conveyor belt), a pick-and-place robot arm, a screw conveyor mechanism, or some other conveyance means. The second conveyor mechanism 125 can receive multiple housings 135. The second conveyor mechanism 125 can receive multiple housings at a regular interval (e.g., every two seconds, every five seconds, every ten seconds, or some other interval). The second conveyor mechanism 125 can receive multiple housings at a regular interval using a timing screw conveyor mechanism. For example, the timing screw conveyor mechanism can include a tapered screw that accepts (e.g., draws from a queue) a single housing 135 at some interval as defined by the tapered screw pitch length and the rotational speed of the tapered screw.

The first conveyor mechanism 105 or the second conveyor mechanism 125 can be a screw-type conveyor mechanism. For example, the first conveyor mechanism 105 can include at least one screw 130 to move the electrode layer stack 110 and the cap 115 in the first direction 120. The first conveyor mechanism 105 can include the screw to move the fixture 415 in the first direction 120 with the cap 115 and electrode layer stack 110 in positioned on the surface 425 of the fixture 415. The second conveyor mechanism 125 can include at least one screw 130 to move the housing 135. The second conveyor mechanism 125 can include the screw 130 to move the housing 135 in the first direction 120. The second conveyor mechanism 125 can include the screw 130 to rotate the housing 135 about the screw 130. The second conveyor mechanism 125 can include the screw 130 to move the housing 135 along a helical path, such as the path 140. For example, the second conveyor mechanism 125 can move the housing 135 along the path 140, where the path 140 wraps around the screw 130 and extends in the first direction 120. The path 140 can be an arcuate path, a curved path, a helical path, or a path having some other form. The path 140 can include a multi-dimension (e.g., three dimensional) movement that includes rotation about the screw 130 and translation in the first direction 120. The path 140 can simultaneously include rotational movement about the screw 130 and translation in the first direction 120.

As depicted in FIGS. 1 and 3, among others, the screw 130 can include a central axis 132 and an auger 134 (e.g., blade, flighting). The screw 130 can rotate about a central axis 132 in a direction 215. For example, the screw 130 can rotate in a first direction (e.g., clockwise or counterclockwise) about the axis 132. The auger 134 can be a helical protrusion extending from a body 133 of the screw 130. For example, the auger 134 can extend from and wrap around the body 133 of the screw to define a helical path from a first longitudinal end to a second longitudinal end of the screw 130. The screw body 133 can include a diameter 180 that is smaller than an auger diameter 320. The auger diameter 320 can be constant or can change along the central axis 132 (e.g., from one longitudinal end to another longitudinal end of the screw 130). For example, the auger 134 can be tapered such that the auger diameter 320 is reduced (e.g., 10-90% reduced) proximate to a longitudinal end of the screw 130. The auger 134 can extend perpendicularly from the screw body 133. The auger 134 can extend at some angle (e.g., 30 degrees, 45 degrees, 60 degrees, or some other angle) from the screw body 133. The auger 134 can be integrally formed with the screw body 133 or can be coupled to the screw body (e.g., via welding, removable fasteners, adhesive, or some other joining method). The auger 134 can meet the screw body 133 at a sharp corner (e.g., 90 degree corner) or at a rounded corner (e.g., a concave or convex fillet).

The auger 134 can define at least one land 315. For example, as shown in FIG. 3, the screw 130 can include multiple lands 315. Each land 315 can be a portion of the auger 134 that extends from the same side of the screw 130. For example, because the auger 134 is continuous and forms a helical path around the screw body 133, the auger 134 protrudes from screw body 133 at a circumferential point at multiple positions along a length of the screw 130. The auger 134 can extend from the body 133 in a helical path to form adjacent lands 315. Each of the lands 315 can be spaced apart from an adjacent land 315 at a pitch distance 175. The pitch distance 175 can be constant or can be varied along the central axis 132 of the screw 130. Adjacent lands 315 of the auger 134 can form at least one supportive surface 165 of the screw 130. For example, two adjacent lands 315 of the auger 134 and a portion of the screw body 133 between the two adjacent lands 315 can collectively form a at least one supportive surface 165. The supportive surface 165 can be a pocket, an indent, an impression, a portion, a region, or an area of the screw body 133 formed between two adjacent lands.

The screw 130 can rotate about the axis 132 at a predetermined rate (e.g., thirty revolutions per minute, sixty revolutions per minute, one hundred revolutions per minute, or some other rate). The screw 130 can rotate at a variable rate. For example, a rate of rotation of the screw 130 can be changed (e.g., increased or decreased) by a computer, controller, electric motor, or other device. The axis 132 about which the screw 130 rotates can be can be parallel with the first direction 120. The axis 132 about which the screw 130 rotates can be at some other angle with respect to the first direction 120. For example, axis 132 can be 5-25 degrees from parallel with the first direction 120. The first direction 120 can be a generally horizontal direction, for example. The axis 132 can extend in a plane that is parallel to a horizontal plane including the first direction 120. The axis 132 can extend in a plane that is non-parallel to a horizontal plane including the first direction 120.

The system 100 can include the second conveyor mechanism 125 to move the housing 135. For example, the screw 130 of the second conveyor mechanism 125 can include the supportive surface 165 that corresponds to the housing 135. The supportive surface 165 of the screw 130 can correspond with a form factor of the housing 135. A rotation of the screw 130 about the axis 132 can translate the housing 135 in the direction of the axis with the housing 135 within the supportive surface 165 of the screw 130. For example, the supportive surface 165 can be defined by two lands 315 spaced apart at a pitch distance 175 that corresponds with (e.g., is 5-25% larger than) a width of the housing 135. As the screw 130 rotates, the housing 135 can ride within (e.g., move within, translate within) the supportive surface 165 in the direction of the central axis 132. For example, the rotation of the screw 130 about the axis 132 can cause at least one land 315 (e.g., a portion of the auger 134) to contact at least one side or point of the housing 135 (e.g., a wall 170). Because the auger 134 is helical, the land 315 is pitched (e.g., non-perpendicular with the central axis 132) such that contact between the land 315 and the housing 135 can cause the housing 135 to move in the direction of the central axis 132 within the supportive surface 165.

The system 100 can include the second conveyor mechanism 125 to rotate the housing 135. For example, the second conveyor mechanism 125 can receive the housing 135 within the supportive surface 165. The housing 135 can ride (e.g., move, remain) within the supportive surface 165 of the screw 130 as the screw 130 rotates about the axis 132. For example, the housing 135 can be received in the supportive surface 165 of the screw 130 with the housing positioned to a first side of the screw 130. The screw 130 can rotate the housing 135 about the axis 132 from the first side of the screw 130 to the second side of the screw 130. For example, the screw 130 can rotate the housing 180 degrees about the axis 132. The second conveyor mechanism 125 can include the screw 130 to move the housing along the path 140. For example, the screw 130 can rotate the housing 135 about the axis 132 as the screw 130 translates the housing 135 in the first direction 120. The path 140 can be an arcuate, curved, or helical path that includes a rotational component and a linear component. For example, the screw 130 can rotate the housing 135 within the supportive surface 165 about the axis 132 while the housing 135 translates in the first direction 120 within the supportive surface 165.

The system 100 can include the second conveyor mechanism 125 to rotate the housing 135 from a first positon 145 to a second position 150. For example, the second conveyor mechanism 125 can receive the housing 135 with the housing 135 in a first position and in a first orientation. As depicted in FIGS. 1-2, among others, the housing 135 can be received in the first position 145. The first position 145 can be located to one side of the screw 130 of the second conveyor mechanism 125. The housing 135 can be in a first orientation with the housing 135 in the first position 145, where the first orientation includes the housing 135 extending in the second direction 205 from the closed end 195 to the open end 155. For example, the cavity 160 can extend from the open end 155 in a direction that is opposite the second direction 205.

The second conveyor mechanism 125 can move the housing from the first position 145 to the second position 150, where the second position 150 is located on another side of the screw 130 and spaced apart from the first position 145 in the first direction 120. For example, as depicted in FIG. 1, among others, the second position 150 can be located on an opposite side of the screw 130 as the first position 145. The second position 150 can be proximate to a longitudinal end of the screw 130 that is opposite a second longitudinal end of the screw that is proximate the first position 145. The path 140 can extend from the first position 145 to the second position 150. For example, the second conveyor mechanism 125 can move the housing 135 along the path 140 from the first position 145 to the second position 150. The second position 150 can include the housing 135 in a second orientation. For example, the second orientation can include the cavity 160 of the housing 135 extending from the open end 155 in the second direction 205. For example, a housing 135 in the second orientation can be inverted by approximately (e.g., ±10 degrees) 180 degrees relative to a housing 135 in the first orientation. A housing 135 in the second orientation can be rotated at some other angle (e.g., 170-190 degrees, 90 degrees) relative to a housing 135 in the first orientation. As the second conveyor mechanism 125 moves the housing 135 from the first position 145 to the second position 150, the second conveyor mechanism 125 can rotate the housing 135 about the axis 132 from the first orientation to the second orientation. For example, the second conveyor mechanism 125 can rotate the housing 135 approximately 180 degrees about the axis 132 as the second conveyor mechanism 125 moves the housing along the path 140 from the first position 145 to the second position 150.

The system 100 can include the second conveyor mechanism 125 including a guide 210. For example, the second conveyor mechanism 125 can include a guide 210 to guide a movement of the housing 135. The guide 210 can be an arcuate, helical, or curved structure that can surround the screw 130 of the second conveyor mechanism 125. For example, the guide 210 can be a helical structure that includes a guide pitch distance 305 and a guide diameter 310. The guide pitch distance 305 can be greater than the pitch distance 175. The guide diameter 310 can be greater than the screw body diameter 180 or the auger diameter 320. The guide 210 can be a curved or arcuate shape that extends over the screw 130. For example, the guide 210 can wrap (e.g., curve, arc, bend) around the screw 130 from a location proximate to the first position 145 to a location proximate the second position 150. The guide 210 can extend on a path similar to the path 140. For example, the guide 210 can extend from the location proximate the first position 145 to the location proximate the second position 150 along the path 140.

The guide 210 can be or include at least one bar that extends over the screw 130. For example, the guide 210 can be a slender member extending from the location proximate the first position 145 to the location proximate the second position 150 along the path 140. The guide 210 can include multiple bars, each extending in a helical, arcuate, or curved path similar to (e.g., exhibiting similar curvature) the path 140 and spaced apart along the axis 132. The guide 210 can include some other structure. For example, the guide 210 can include a rigid ribbon-shaped structure that wraps around the screw 130 along a helical, arcuate, or curved path, such as the path 140. The guide 210 can be a continuous structure or member extending from the location proximate the first position 145 to the location proximate the second position 150 along the path 140. The guide 210 can be a discontinuous structure or member extending from the location proximate the first position 145 to the location proximate the second position 150 along the path 140. For example, the guide 210 can include multiple members spaced apart from adjacent members but collectively extending along the path 140. The guide 210 can be or include a friction-reducing or non-marring member. For example, the guide 210 can include a plastic (e.g., polyethylene, polytetrafluoroethylene, or another polymeric material) element that can reduce friction or wear between the guide 210 and any object moving thereon (e.g., the housing 135), or can be non-marring to prevent the guide 210 from imparting scratches, scuffs, or marks on an object riding thereon (e.g., the housing 135).

The system 100 can include the second conveyor mechanism 125 to move the housing 135 between the screw 130 and the guide 210. For example, the second conveyor mechanism 125 can move the housing 135 between the screw 130 and the guide along the path 140. The second conveyor mechanism 125 can move the housing from the first position 145 to the second position 150 along the path 140, where the housing 135 can ride within the supportive surface 165 and between the screw 130 and the guide 210. For example, the guide 210 can be positioned around the screw 130 such that a space (e.g., gap, distance, void) exists between the screw 130 and the guide 210. The guide 210 can be positioned around the screw 130 such that the guide 210 is spaced apart from the screw body 133 (e.g., an area of the screw 130 within the supportive surface 165) at distance, where the distance can be approximately equal (e.g., ±25%) than a dimension (e.g., length, width, height) of the housing 135. For example, the housing 135 can include a width 505 that is approximately equal to the distance between the screw body 133 and the guide 210 such that the housing 135 can fit between the screw body 133 and the guide 210. The housing 135 can be positioned within the supportive surface 165 of the screw 130 (e.g., against the screw body 133 and between two adjacent lands 315) and between the screw body 133 and the guide 210. The housing 135 can include a width 505 that is slightly greater than (e.g., ±5-25% greater) than a distance between the guide 210 and the screw body 133 such that a wall 170 of the housing 135 can contact (e.g., touch, ride against) the guide 210 with the housing 135 within the supportive surface 165. The guide 210 can include multiple members or structures that are placed at varying distances from the screw body 133. For example, the guide 210 can include a first portion (e.g., a first bar or member) positioned a first distance from the screw body 133 and a second portion (e.g., a second bar or member) positioned a second distance from the screw body 133. The first distance can be less than the width 505 of the housing such that the housing cannot pass between the first portion and the screw body 133. The second distance can be larger than the width 505 such that the housing 135 can pass between second portion and the screw body 133.

The system 100 can include the second conveyor mechanism 125 including the guide 210 to direct the movement of the housing 135. For example, the second conveyor mechanism 125 can move the housing 135 along the path 140 with the housing 135 positioned within the supportive surface 165 and between the guide 210 and the screw body 133. As the second conveyor mechanism 125 moves the housing 135, the guide 210 can contact a portion of the housing 135. For example, the guide 210 or a portion of the guide 210 can be positioned a distance from the screw body 133, where the distance is less than the width 505 of the housing. Because the distance is less than the width 505 of the housing, the guide 210 (or a portion of the guide 210) can prevent the housing 135 from passing between the guide 210 and the screw body 133 as may occur if the screw 130 were moving the housing 135 linearly in the first direction 120. The guide 210 can prevent the housing 135 from translating only in the linear first direction 120, and can instead force the housing 135 to rotate along the path 140 with the housing 135 within the supportive surface 165. As the second conveyor mechanism 125 moves the housing 135, a portion of the housing (e.g., a wall 170) can contact the guide 210 to prevent the housing 135 from translating in a purely linear direction, namely the first direction 120. Instead, the guide 210 can contact the housing 135 to cause the housing 135 to rotate about the screw 130 along the path 140. The guide 210 can cause the housing 135 to rotate about the axis 132 and along the path 140 from the first position 145 to the second position 150.

The system 100 can include the second conveyor mechanism 125 to move the housing 135 at a first rate. For example, the screw 130 of the second conveyor mechanism 125 can rotate at a predetermined rate. The rate of rotation of the screw 130 can cause the housing 135 to move at a first rate along the path 140. For example, the rate of rotation of the screw 130 can cause the housing 135 to move from the first position 145 to the second position 150 at a first rate. The first rate can be an amount of time, such as five seconds, ten seconds, or some other time interval. The second conveyor mechanism 125 can move the housing 135 from the first position 145 to the second position 150 at the first rate (e.g., in a predetermined amount of time). The rate of rotation of the screw 130 can be controlled by a computer, a controller, an electric motor, or by some other device. The rate at which the housing 135 is moved from the first position 145 to the second position 150 can be controlled by the rate of rotation of the screw 130 or by other properties of the screw 130. For example, the variation in the pitch distance 175, the auger diameter 320, or the screw diameter 180 can influence the first rate in order to vary an amount of time it takes for the housing 135 to move from the first position 145 to the second position 150.

The system 100 can include the first conveyor mechanism 105 to move the electrode layer stack 110 and the cap 115 at the first rate. For example, the first conveyor mechanism 105 can receive an electrode layer stack 110 and a cap 115 and can move the electrode layer stack 110 and cap 115 in the first direction 120 at the first rate. The first conveyor mechanism 105 can move the cap 115 and the electrode layer stack 110 at the first rate such that an electrode layer stack 110 and cap 115 can be positioned along the first conveyor mechanism 105 as to be received by the housing 135. For example, at the moment when the housing 135 arrives at the second position 150 (after being moved by the second conveyor mechanism 125 from the first position 145), the first conveyor mechanism 105 can position the electrode layer stack 110 to be received within the cavity 160 of the housing 135 and position the cap 115 to couple with (e.g., be secured to, join with) the open end 155 of the housing 135. The first conveyor mechanism 105 can move the electrode layer stack 110 and the cap 115 at an appropriate rate or speed such that the housing 135 can be provided over the electrode layer stack 110 to assemble the battery cell 185.

The system 100 can include the second conveyor mechanism 125 to provide the housing 135 over the electrode layer stack 110. For example, the system 100 can include the housing 135 to receive (e.g., accept, be placed over) the electrode layer stack 110 with the housing 135 in the second position 150. The cavity 160 of the housing 135 can extend from the open end 155 in the second direction 205 with the housing 135 in the second positon 150. The first conveyor mechanism 105 can receive the cap 115 and the electrode layer stack 110 with the electrode layer stack 110 extending from the cap 115 in the second direction 205. The housing 135 can be placed over the electrode layer stack 110 with the housing in the second position 150. For example, the electrode layer stack 110, which can extend in the second direction 205, can be received within the cavity 160 of the housing 135, which can also extend in the second direction 205 with the housing 135 in the second position 150. The cavity 160 of the housing 135 can include a dimension (e.g., length, width, height, volume, or other dimension) that is slightly larger (e.g., 5-10% larger) than a dimension (e.g., length, width, height, volume) of the electrode layer stack 110. The second conveyor mechanism 125 can move the housing 135 along the path 140 the cavity 160 can receive the electrode layer stack 110 with the housing 135 in the second position 150 without the walls 170 or open end 155 of the housing 135 contacting (e.g., touching, colliding with, rubbing against) the electrode layer stack 110. For example, the cavity 160 can receive the electrode layer stack 110 without any contact occurring between the electrode layer stack 110 and any portion of the housing 135.

The system 100 can include the second conveyor mechanism 125 to secure the cap 115 to the open end 155 of the housing 135. For example, the open end 155 of the housing 135 can contact (e.g., touch, collide with, mate with) the cap 115 with the electrode layer stack 110 received within the cavity 160 of the housing 135. The second conveyor mechanism 125 can move the housing 135 (e.g., rotate the housing 135, move the housing 135 along the path 140) at a velocity or speed. The housing 135 can be in motion (e.g., along the path 140 or otherwise) as the second conveyor mechanism 125 provides the housing 135 over the electrode layer stack 110. The motion of the housing 135 can cause the open end 155 of the housing 135 to contact the cap 115 with a force. The force can cause the open end 155 to be secured within the cap 115 or can cause the cap 115 to be secured to the open end 155 of the housing, as the case may be. For example, the cap 115 can include the interfacing mechanism 410 to interface with (e.g., couple with, secure to, mate with) the open end 155 of the housing. As shown in FIG. 4, the interfacing mechanism 410 can be a perimetral groove that can receive the open end 155 (e.g., a perimetral lip of the open end 155) of the housing 135. The force of the housing 135 caused by the movement of the housing 135 via the second conveyor mechanism 125 can be a sufficient force to cause the interfacing mechanism 410 and the open end 155 to become secured together (e.g., mated, joined, coupled, interlocked, or otherwise secured). For example, the force can cause the open end 155 to be received within the perimetral groove of the interfacing mechanism 410, where a protrusion or lip within the perimetral groove can latch to the open end 155 of the housing 135. The interfacing mechanism 410 and the open end 155 can be secured via some other interaction. The cap 115 can be secured to the open end 155 such that the cap 115 and the housing 135 encapsulate the electrode layer stack 110. The cap 115 can be secure to the open end 155 of the housing 135 such that the cap 115 is detachably secured to the housing 135. For example, the cap 115 can be secured to the housing 135, but can be removed from the housing 135 upon application of a sufficient removing force (e.g., 10 lbs force or some amount). The open end 155 and the cap 115 can be detachably coupled together such that the housing 135 can be lifted from the cap 115 with minimal force. The housing 135 can be positioned over the electrode layer stack 110 with the cap 115 secured to or coupled with the open end 155.

The system 100 can include the first conveyor mechanism 105 to move the housing 135, the electrode layer stack 110, and the cap 115. For example, after the second conveyor mechanism 125 provides the housing 135 over the electrode layer stack 110 and secures the cap 115 to the housing 135, the housing, the electrode layer stack 110, and the cap 115 can collectively move as one unit. As the first conveyor mechanism 105 continues to move the cap 115 and the electrode layer stack 110 in the first direction 120 after the electrode layer stack 110 has been received by the cavity 160, housing 135 can move along with the cap 115 and the electrode layer stack 110. For example, the first conveyor mechanism 105 can translate the housing 135, the electrode layer stack 110, and the cap 115 in the first direction 120 beyond the second position 150 (e.g., past a position where the housing 135 is provided over the electrode layer stack 110). The first conveyor mechanism 105 can move the housing 135, the electrode layer stack 110, and the cap 115 in the first direction 120 via a fixture 415, where the fixture 415 can constrain a position of the housing 135 in addition to constraining a position of the cap 115. For example, with the housing 135 secured to the cap 115, the positioning device 430 of the fixture 415 can act to constrain a position of (e.g., limit unintended movement of) the housing 135 as the housing 135, the electrode layer stack 110, and the cap 115 are collectively moved in the first direction 120.

The system 100 can include a welding device 190 to secure the cap 115 to the housing 135. For example, the cap 115 can be detachably secured to the open end 155 of the housing 135 after the second conveyor mechanism 125 provides the housing 135 over the electrode layer stack 110. The welding device 190 can weld the cap 115 to the housing 135 to permanently secure the cap 115 to the housing 135. For example, the welding device 190 can be a friction welder, a metal inert gas (MIG) welder, a tungsten inert gas (TIG) welder, or some other welding device. The welding device 190 can include or be coupled with a robotic arm, where the robotic arm can robotically and precisely articulate a welding head. The robotic arm can cause the welding device 190 to weld a joint at an interface between the cap 115 and the housing 135. For example, the welding device 190 can weld a bead around the perimeter of the housing where the housing 135 meets the cap 115.

The welding device 190 can weld the housing 135 and the cap 115 after the second conveyor mechanism 125 provides the housing 135 over the electrode layer stack 110. For example, the first conveyor mechanism 105 can move the housing 135, the electrode layer stack 110, and the cap 115 in the first direction 120 after the second conveyor mechanism 125 provides the housing 135 over the electrode layer stack 110. The welding device 190 can be positioned downstream of the second position 150 such that after the housing 135 is provided over the electrode layer stack 110 and joined with the cap 115, the welding device 190 can weld the housing 135 to the cap 115.

The system 100 can include the second conveyor mechanism 125 including a first screw 130 and a second screw 130. For example, the second conveyor mechanism 125 can include the first screw 130 defining a supportive surface 165 that corresponds to a form factor of the housing 135. The second conveyor mechanism 125 can include the second screw 130 defining a pocket that corresponds to a form factor of the housing 135. The first screw 130 can include a central axis 132 that is parallel with a central axis 132 of the second screw 130. The first screw 130 and the second screw 130 can be spaced apart from each other such that a distance between the screw body 133 of the first screw 130 and the screw body 133 of the second screw 130 is approximately equal to (e.g., 1-25% larger than) a dimension of the housing 135 (e.g., width of the housing). The first screw 130 can include an auger 134 having a pitch distance 175 that is substantially similar (e.g., ±5%) to a pitch distance 175 of an auger 134 of the second screw 130. The auger 134 and at least one supportive surface 165 of the first screw 130 can be aligned with the auger 134 and supportive surface 165 of the second screw 130. For example, the auger 134 of the first screw 130 can protrude from the screw body 133 of the first screw 130 and towards the auger 134 of the second screw 130.

The system 100 can include the second conveyor mechanism 125 including the first screw 130 and the second screw 130 to move the housing 135. For example, the second conveyor mechanism 125 can include the first screw 130 and the second screw 130 to move the housing 135 in the first direction with the housing positioned within a supportive surface 165 of the first screw 130 and a pocket of the second screw 130. The housing 135 can be positioned simultaneously positioned within the supportive surface 165 of the first screw 130 and the second screw 130. As the first screw 130 and second screw 130 rotate, at least one land 315 of the first screw 130 and at least one land 315 of the second screw 130 can contact (e.g., touch, apply a force to) the housing 135 and can cause the housing to move in the first direction 120. The first screw 130 and the second screw 130 can move the housing 135 in the first direction 120 for a distance until the housing 135 contacts the guide 210 positioned around the first screw 130. With the guide 210 contacting the housing 135, the guide 210 cause the housing 135 to rotate about the axis 132 of the first screw 130. With the guide 210 contacting the housing 135, the housing 135 can move along the path 140 around the first screw 130 and away from the second screw 130.

The system 100 can include the second conveyor mechanism 125 including the first screw 130, the second screw 130, and a third screw 130. For example, the first screw 130, the second screw 130, and the third screw 130 can extend in the first direction 120 and can rotate about parallel axes. The first screw 130, the second screw 130, and the third screw 130 can rotate about non-parallel axes. The first screw 130 can be positioned between the second screw 130 and the third screw 130. The first screw 130 and the second screw 130 can move the housing 135 in the first direction 120 with the housing 135 positioned within the supportive surface 165 of the first screw 130 and the supportive surface 165 of the second screw 130. The guide 210 can contact the housing 135 to cause the housing 135 to rotate about the first screw 130 along the path 140 and away from the second screw 130. The first screw 130 and the guide 210 can move the housing 135 along the path 140 towards the second positon 150. As the housing 135 approaches the second position 150, the housing 135 can be received within a supportive surface 165 of the third screw 130. For example, the third screw 130 can include the supportive surface 165 corresponding to the form factor of the housing 135. The third screw 130 can rotate to cause the housing 135 to move in the first direction 120. The third screw 130 can rotate to cause the housing 135 to move in a direction towards the first conveyor mechanism 105. The third screw 130 can include an auger 134 having a profile (e.g., helical path) that is different than the first screw 130. For example, the third screw 130 can include an auger 134 that extends from the screw body 133 of the third screw 130 along a direction that is opposite the first screw 130. The third screw 130 can include a plurality of lands 315 that extend radially from the screw body 133 and not in a helical path. For example, the lands 315 of the third screw 130 can be rings rather than a helical auger. The third screw 130 can be configured to prevent the housing 135 from moving in the first direction 120 once the housing 135 reaches the second position 150. For example, the third screw 130 can be configured to cause the housing 135 to move towards the first conveyor mechanism 105 in order to cause the housing 135 to be provided over the electrode layer stack 110 and secured to the cap 115.

The system 100 can include the first conveyor mechanism 105 including at least one screw 130 defining a supportive surface 165. The system 100 can include the first conveyor mechanism 105 including a screw 130 to move the cap 115 and the electrode layer stack 110 in the first direction 120. For example, the supportive surface 165 can be defined by adjacent lands 315. The supportive surface 165 of the screw 130 of the first conveyor mechanism 105 can correspond to a form factor of the cap 115 or a form factor of the fixture 415. For example, the screw 130 of the first conveyor mechanism 105 can move receive the cap 115 (and the electrode layer stack 110 positioned thereon and extending in the second direction 205) within the supportive surface 165. As the screw 130 rotates, the first conveyor mechanism 105 can translate (e.g., move in a linear fashion) the cap 115 and the electrode layer stack 110 in the first direction. The first conveyor mechanism 105 can include the screw 130 without a guide 210. For example, the screw 130 of the first conveyor mechanism 105 can move the electrode layer stack 110 and cap 115 in the first direction 120 without causing the electrode layer stack 110 and the cap 115 to rotate about the axis 132 of the screw 130. The screw 130 can receive the fixture 415 (and the cap 115 and electrode layer stack 110 positioned thereon) and can translate (e.g., move in a linear fashion) the fixture 415 in the first direction 120. The screw 130 of the first conveyor mechanism 105 can move the fixture 415, electrode layer stack 110, or the cap 115 in the first direction 120 to a position proximate the second position 150 of the housing 135 such that the electrode layer stack 110 can be inserted within the cavity 160 of the housing 135. The screw 130 of the first conveyor mechanism 105 can move the fixture 415, electrode layer stack 110, or the cap 115 in the first direction 120 at the first rate such that the electrode layer stack 110 is positioned to be inserted within the cavity 160 of the housing 135 at an appropriate time (e.g., when a housing 135 arrives in the second position 150).

The system 100 can include the first conveyor mechanism 105 as a substrate conveyor mechanism. For example, the first conveyor mechanism 105 can be a conveyor mechanism other than a screw-type conveyor mechanism. The first conveyor mechanism 105 can translate the fixture 415, the cap 115, or the electrode layer stack 110 in the first direction 120 without causing the fixture 415, the cap 115, or the electrode layer stack 110 to rotate (e.g., about an axis of a screw). Because no rotational movement is required (or desired), the first conveyor mechanism 105 can be a substrate conveyor including a conveyor surface such as a conveyor belt and at least one roller operatively coupled with the conveyor surface to drive the conveyor surface in the first direction 120. The fixture 415 or cap 115 can be positioned on the conveyor surface and can move along with the conveyor surface as the conveyor surface is driven in the first direction 120. The rollers of the substrate conveyor can rotate at a speed such that the fixture 415 or cap 115 arrives at a position proximate to the second position 150 of the housing 135 to allow for the electrode layer stack 110 to be inserted within the cavity 160.

As depicted in FIG. 2, among others, the second conveyor mechanism 125 can provide the housing 135 of over an electrode layer stack 110 and can secure the housing 135 to the cap 115. The movement of the housing 135 is shown at time intervals 220, 225, 230, 235, 240, 245, and 250, for example. At interval 220, the housing 135 can be received by the second conveyor mechanism 125 with the housing in the first position 145 and first orientation. For example, the housing 135 can be positioned with a supportive surface 165 of the first screw 130 of the second conveyor mechanism 125 around which the guide 210 is positioned. The housing 135 can also be positioned within a supportive surface 165 of the second screw 130 at interval 220. The housing 135 can be oriented such that the cavity 160 extends from the open end 155 of the housing 135 in a direction opposite the second direction 205. The cap 115 and the electrode layer stack 110 can be provided to the first conveyor mechanism 105. The electrode layer stack 110 can extend in the second direction 205. At interval 225, the housing 135 can begin a rotational movement around the first screw 130 of the second conveyor mechanism 125. For example, the guide 210 can contact the housing 135 and can cause the housing 135 to rotate about the first screw 130 as the first screw rotates in the direction 215. At intervals 230 and 235, the housing 135 can continue a rotational movement around the first screw 130 of the second conveyor mechanism 125. For example, the housing 135 can rotate around the first screw 130 with the housing 135 positioned within a supportive surface 165 of the first screw 130. The housing 135 can be positioned between the screw body 133 and the guide 210. A portion of the housing 135 can contact the guide 210, where the contact between the guide 210 and the housing 135 can cause the housing to rotate about the screw 130. At interval 230, the housing 135 can be rotated approximately 90 degrees from the first orientation. At interval 235, the housing can be rotated approximately 135 degrees from the first orientation.

At interval 240, the housing 135 can be rotated approximately (e.g., ±10 degrees) 180 degrees from the first orientation. For example, the housing 135 can be oriented such that the cavity 160 extends from the open end 155 in the second direction 205. The housing 135 can cease contacting the guide 210 at interval 240. For example, at interval 240, the housing 135 can avoid contacting the guide 210 such that the guide 210 does not cause the housing 135 to rotate further about the screw 130. The housing 135 can be received by a third screw 130 of the second conveyor mechanism 125 at interval 240. For example, the housing 135 can be received within a supportive surface 165 of the third screw 130. The third screw 130 can cause the housing 135 to move towards the first conveyor mechanism 105. The electrode layer stack 110 can be positioned to be received by the housing 135. At interval 245, the housing 135 can move towards the first conveyor mechanism 105. The housing 135 can be provided over the electrode layer stack 110 at interval 245. For example, the electrode layer stack 110 can be positioned to be inserted into the cavity 160 of the housing 135 at interval 240. The movement of the housing 135 in a direction towards the first conveyor mechanism 105 (e.g., a direction opposite the second direction 205) can cause the housing 135 to move over the electrode layer stack 110. For example, the electrode layer stack 110 can extend within the cavity 160 of the housing 135. At interval 250, the housing 135 can be provided completely over the electrode layer stack 110. The housing 135 can be secured to (e.g., couple with, join with, contact) the cap 115 with the electrode layer stack 110 extending into the cavity 160 of the housing 135. For example, the open end 155 of the housing 135 can interface with the interfacing mechanism 410 of the cap 115 to secure the cap 115 with the open end 155 of the housing 135. The housing 135 and the cap 115 can encapsulate the electrode layer stack 110 at interval 250. Subsequent to interval 250, the housing 135 can be welded to the cap 115 to permanently secure the housing 135 to the cap 115.

Figure 6:
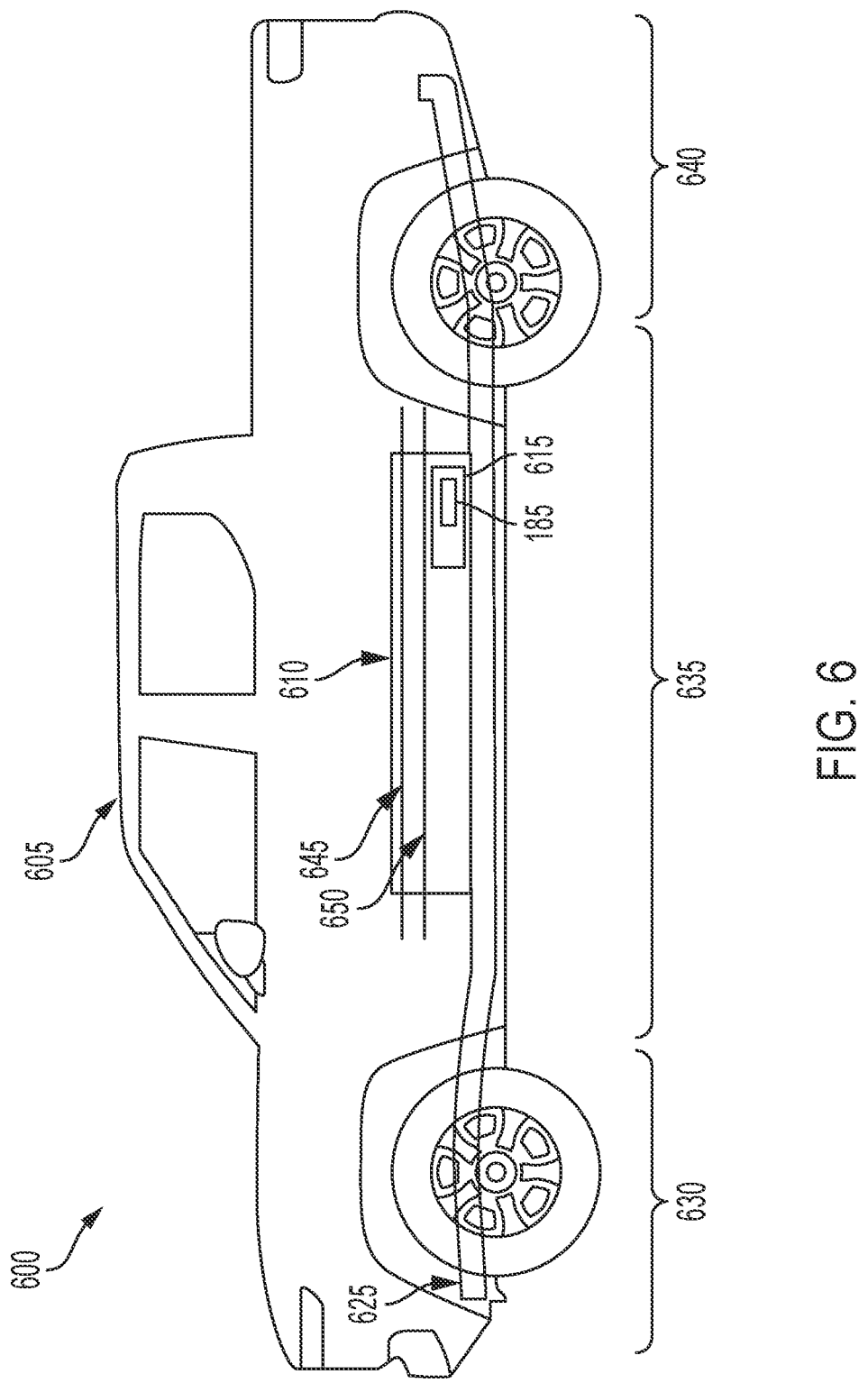
FIG. 6 depicts an example electric vehicle, in accordance with some aspects.

FIG. 6 depicts an example cross-sectional view 600 of an electric vehicle 605 installed with at least one battery pack 610. Electric vehicles 605 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 610 can also be used as an energy storage system to power a building, such as a residential home or commercial building. Electric vehicles 605 can be fully electric or partially electric (e.g., plug-in hybrid) and further, electric vehicles 605 can be fully autonomous, partially autonomous, or unmanned. Electric vehicles 605 can also be human operated or non-autonomous. Electric vehicles 605 such as electric trucks or automobiles can include on-board battery packs 610, batteries 615 or battery modules 615, or battery cells 185 to power the electric vehicles. The electric vehicle 605 can include a chassis 625 (e.g., a frame, internal frame, or support structure). The chassis 625 can support various components of the electric vehicle 605. The chassis 625 can span a front portion 630 (e.g., a hood or bonnet portion), a body portion 635, and a rear portion 640 (e.g., a trunk, payload, or boot portion) of the electric vehicle 605. The battery pack 610 can be installed or placed within the electric vehicle 605. For example, the battery pack 610 can be installed on the chassis 625 of the electric vehicle 605 within one or more of the front portion 630, the body portion 635, or the rear portion 640. The battery pack 610 can include or connect with at least one busbar, e.g., a current collector element. For example, the first busbar 645 and the second busbar 650 can include electrically conductive material to connect or otherwise electrically couple the battery 615, the battery modules 615, or the battery cells 185 with other electrical components of the electric vehicle 605 to provide electrical power to various systems or components of the electric vehicle 605.

Figure 7:
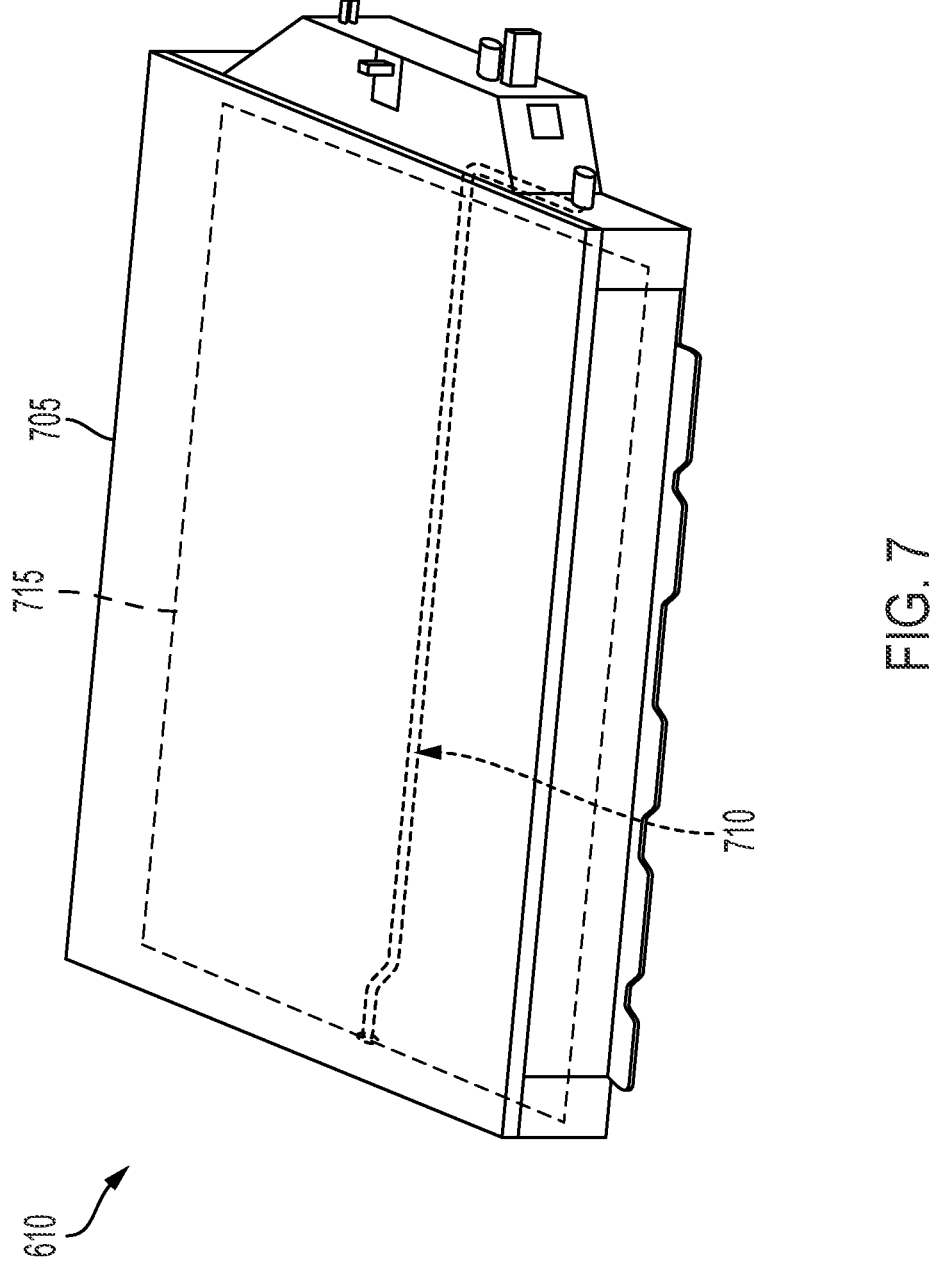
FIG. 7 depicts an example battery pack, in accordance with some aspects.

FIG. 7 depicts an example battery pack 610. Referring to FIG. 7, among others, the battery pack 610 can provide power to electric vehicle 605. Battery packs 610 can include any arrangement or network of electrical, electronic, mechanical or electromechanical devices to power a vehicle of any type, such as the electric vehicle 605. The battery pack 610 can include at least one housing 705. The housing 705 can include at least one battery module 615 or at least one battery cell 185, as well as other battery pack components. The battery module 615 can be or can include one or more groups of prismatic cells, cylindrical cells, or other form factors of battery cells 185. The housing 705 can include a shield on the bottom or underneath the battery module 615 to protect the battery module 615 and/or battery cells 185 from external conditions, for example if the electric vehicle 605 is driven over rough terrains (e.g., off-road, trenches, rocks, etc.) The battery pack 610 can include at least one cooling line 710 that can distribute fluid through the battery pack 610 as part of a thermal/temperature control or heat exchange system that can also include at least one thermal component (e.g., cold plate) 715. The thermal component 715 can be positioned in relation to a top submodule and a bottom submodule, such as in between the top and bottom submodules, among other possibilities. The battery pack 610 can include any number of thermal components 715. For example, there can be one or more thermal components 715 per battery pack 610, or per battery module 615. At least one cooling line 710 can be coupled with, part of, or independent from the thermal component 715.

Figure 8:
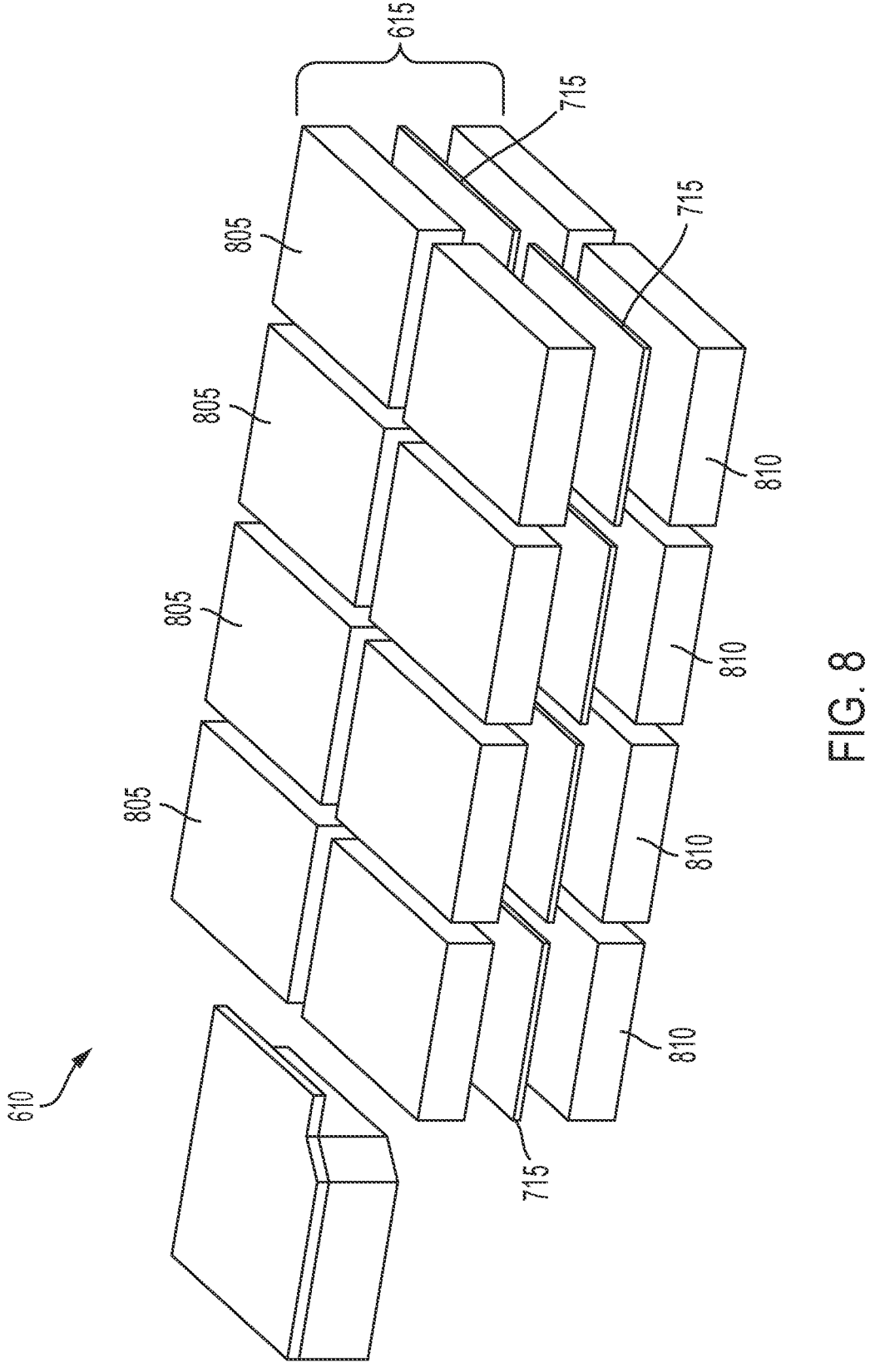
FIG. 8 depicts an example battery module, in accordance with some aspects.
Figure 10:
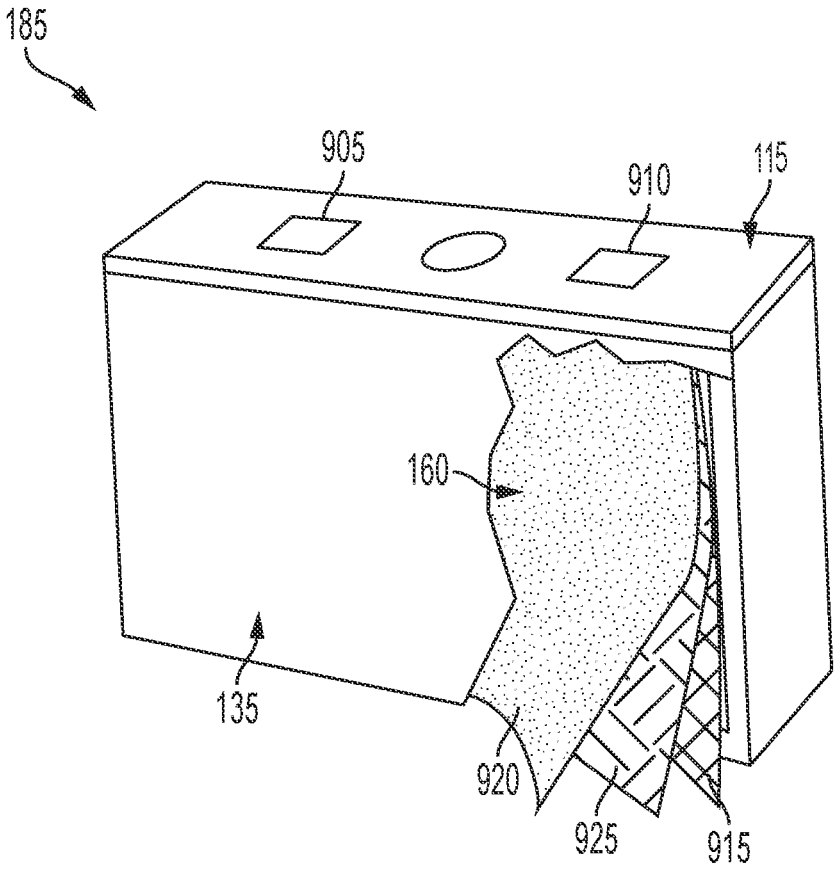
FIG. 10 depicts a cross sectional view of an example battery cell, in accordance with some aspects.

FIG. 8 depicts example battery modules 615, and FIGS. 9 and 10 depict an example cross sectional view of a battery cell 185. The battery modules 615 can include at least one submodule. For example, the battery modules 615 can include at least one first (e.g., top) submodule 805 or at least one second (e.g., bottom) submodule 810. At least one thermal component 715 can be disposed between the top submodule 805 and the bottom submodule 810. For example, one thermal component 715 can be configured for heat exchange with one battery module 615. The thermal component 715 can be disposed or thermally coupled between the top submodule 805 and the bottom submodule 810. One thermal component 715 can also be thermally coupled with more than one battery module 615 (or more than two submodules 805, 810). The thermal components 715 shown adjacent to each other can be combined into a single thermal component 715 that spans the size of one or more submodules 805 or 810. The thermal component 715 can be positioned underneath submodule 805 and over submodule 810, in between submodules 805 and 810, on one or more sides of submodules 805, 810, among other possibilities. The thermal component 715 can be disposed in sidewalls, cross members, structural beams, among various other components of the battery pack, such as battery pack 610 described above. The battery submodules 805, 810 can collectively form one battery module 615. In some examples each submodule 805, 810 can be considered as a complete battery module 615, rather than a submodule.

The electric vehicle 605 can include the battery cell 185 manufactured or assembled by the system 100. For example, the battery modules 615 can each include a plurality of battery cells 185. The battery modules 615 can be disposed within the housing 705 of the battery pack 610. The battery modules 615 can include battery cells 185 that are cylindrical cells or prismatic cells, for example. The battery module 615 can operate as a modular unit of battery cells 185. For example, a battery module 615 can collect current or electrical power from the battery cells 185 that are included in the battery module 615 and can provide the current or electrical power as output from the battery pack 610. The battery pack 610 can include any number of battery modules 615. For example, the battery pack can have one, two, three, four, five, six, seven, eight, nine, ten, eleven, twelve or other number of battery modules 615 disposed in the housing 705. It should also be noted that each battery module 615 may include a top submodule 805 and a bottom submodule 810, possibly with a thermal component 715 in between the top submodule 805 and the bottom submodule 810. The battery pack 610 can include or define a plurality of areas for positioning of the battery module 615 and/or battery cells 185. The battery modules 615 can be square, rectangular, circular, triangular, symmetrical, or asymmetrical. In some examples, battery modules 615 may be different shapes, such that some battery modules 615 are rectangular but other battery modules 615 are square shaped, among other possibilities. The battery module 615 can include or define a plurality of slots, holders, or containers for a plurality of battery cells 185. It should be noted the illustrations and descriptions herein are provided for example purposes and should not be interpreted as limiting. For example, the battery cells 185 can be inserted in the battery pack 610 without battery modules 805 and 810. The battery cells 185 can be disposed in the battery pack 610 in a cell-to-pack configuration without modules 805 and 810, among other possibilities.

Battery cells 185 have a variety of form factors, shapes, or sizes. For example, battery cells 185 can have a cylindrical, rectangular, square, cubic, flat, pouch, or prismatic form factor. As depicted in FIG. 9, for example, the battery cell 185 can be cylindrical. As depicted in FIG. 10, for example, the battery cell 185 can be prismatic. Battery cells 185 can be assembled, for example, by inserting a winded or stacked electrode roll (e.g., a jelly roll) including electrolyte material into at least one battery cell housing 135. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 185 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 185. The housing 135 can be of various shapes, including cylindrical or rectangular, for example. Electrical connections can be made between the electrolyte material and components of the battery cell 185. For example, electrical connections to the electrodes with at least some of the electrolyte material can be formed at two points or areas of the battery cell 185, for example to form a first polarity terminal 905 (e.g., a positive or anode terminal) and a second polarity terminal 910 (e.g., a negative or cathode terminal). The polarity terminals can be made from electrically conductive materials to carry electrical current from the battery cell 185 to an electrical load, such as a component or system of the electric vehicle 605.

For example, the battery cell 185 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 185 to separate the anode and cathode from each other and to facilitate transfer of lithium ions between the anode and cathode. Battery cell 185 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_x$-$PO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, $SnS—P_2S_5$, $Li_2S—SiS_2$, $Li_2S—P_2S_5$, $Li_2S—GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 185 can be included in battery modules 615 or battery packs 610 to power components of the electric vehicle 605. The battery cell housing 135 can be disposed in the battery module 615, the battery pack 610, or a battery array installed in the electric vehicle 605. The housing 135 can be of any shape, such as cylindrical with a circular (e.g., as depicted in FIG. 9, among others), elliptical, or ovular base, among others. The shape of the housing 135 can also be prismatic with a polygonal base, as shown in FIGS. 5 and 10, among others. The housing 135 can include other form factors, such as a triangle, a square, a rectangle, a pentagon, and a hexagon, among others. In some embodiments, the battery pack 610 may not include modules 615 (e.g., module-free). For example, the battery pack 610 can have a module-free or cell-to-pack configuration where the battery cells 185 are arranged directly into a battery pack 610 without assembly into a module 615.

The housing 135 of the battery cell 185 can include one or more materials with various electrical conductivity or thermal conductivity, or a combination thereof. The electrically conductive and thermally conductive material for the housing 135 of the battery cell 185 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 135 of the battery cell 185 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 135 of the battery cell 185 is prismatic (e.g., as depicted in FIG. 10, among others) or cylindrical (e.g., as depicted in FIG. 9, among others), the housing 135 can include a rigid or semi-rigid material such that the housing 135 is rigid or semi-rigid (e.g., not easily deformed or manipulated into another shape or form factor). The housing 135 can include a flexible, malleable, or non-rigid material such that the housing 135 can be bent, deformed, manipulated into another form factor or shape.

The battery cell 185 can include at least one anode layer 915, which can be disposed within the cavity 160 defined by the housing 135. The anode layer 915 can include a first redox potential. The anode layer 915 can receive electrical current into the battery cell 185 and output electrons during the operation of the battery cell 185 (e.g., charging or discharging of the battery cell 185). The anode layer 915 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated) or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 185 can include at least one cathode layer 920 (e.g., a composite cathode layer compound cathode layer, a compound cathode, a composite cathode, or a cathode). The cathode layer 920 can include a second redox potential that can be different than the first redox potential of the anode layer 915. The cathode layer 920 can be disposed within the cavity 160. The cathode layer 920 can output electrical current out from the battery cell 185 and can receive electrons during the discharging of the battery cell 185. The cathode layer 920 can also release lithium ions during the discharging of the battery cell 185. Conversely, the cathode layer 920 can receive electrical current into the battery cell 185 and can output electrons during the charging of the battery cell 185. The cathode layer 920 can receive lithium ions during the charging of the battery cell 185.

The battery cell 185 can include an electrolyte layer 925 disposed within the cavity 160. The electrolyte layer 925 can be arranged between the anode layer 915 and the cathode layer 920 to separate the anode layer 915 and the cathode layer 920. The electrolyte layer 925 can transfer ions between the anode layer 915 and the cathode layer 920. The electrolyte layer 925 can transfer cations from the anode layer 915 to the cathode layer 920 during the operation of the battery cell 185. The electrolyte layer 925 can transfer anions (e.g., lithium ions) from the cathode layer 920 to the anode layer 915 during the operation of the battery cell 185.

The redox potential of layers (e.g., the first redox potential of the anode layer 915 or the second redox potential of the cathode layer 920) can vary based on a chemistry of the respective layer or a chemistry of the battery cell 185. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 920). Lithium-ion batteries can include a graphite chemistry, a silicon-graphite chemistry, or a lithium metal chemistry for the anode layer (e.g., the anode layer 915).

For example, lithium-ion batteries can include an olivine phosphate ($LiMPO_4$, M=Fe and/or Co and/or Mn and/or Ni)) chemistry, LISICON or NASICON Phosphates ($Li_3M_2$ $(PO_4)_3$ and $LiMPO_4O_x$, M=Ti, V, Mn, Cr, and Zr), for example Lithium iron phosphate (LFP), Lithium iron manganese phosphate (LMFP), a layered oxides ($LiMO_2$, M=Ni and/or Co and/or Mn and/or Fe and/or Al and/or Mg) examples NMC (Nickel Manganese Cobalt) chemistry, an NCA (Nickel Cobalt Aluminum) chemistry, or an LCO (lithium cobalt oxide) chemistry for a cathode layer, Lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 925 can include or be made of a liquid electrolyte material. For example, the electrolyte layer 925 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 925 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 925 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, SnS—$P_2S_5$, $Li_2S$—$SiS_2$, $Li_2S$—$P_2S_5$, $Li_2S$—$GeS_2$, $Li_{10}GeP_2Si_2$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 11:
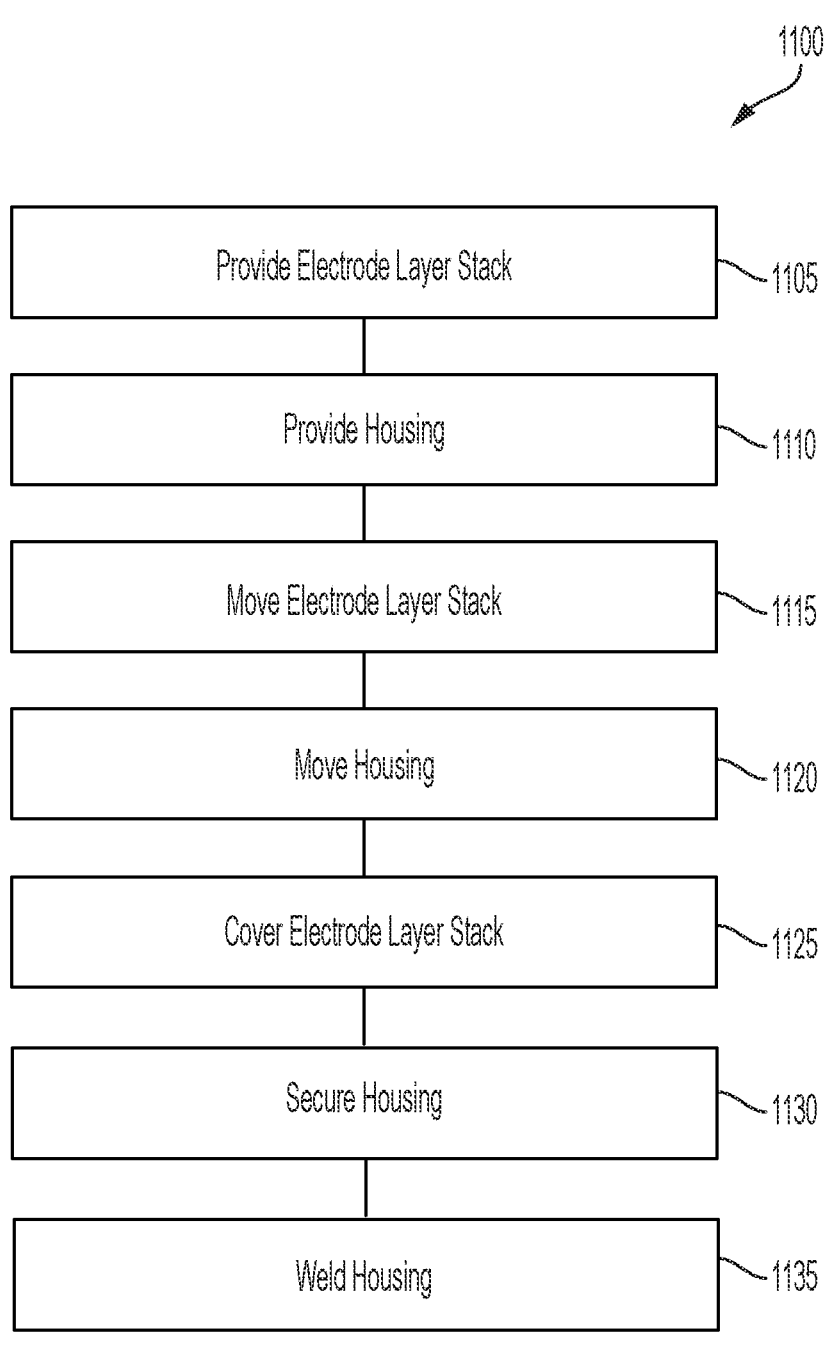
FIG. 11 is a flowchart of an example method of manufacturing a battery cell, in accordance with some aspects.

FIG. 11 depicts an example method 1100 for assembling a battery cell 185. For example, the method 1100 can include at least one of ACTS 1105-1135. The method 1100 can be performed by the system 100 described herein or some other system, for example.

The method 1100 can include providing the electrode layer stack 110 at ACT 1105. For example, the method 1100 can include providing the electrode layer stack 110 to the first conveyor mechanism 105 at ACT 1105. The electrode layer stack 110 can be provided to the first conveyor mechanism 105 along with a cap 115. For example, the electrode layer stack 110 can abut (e.g., contact, be positioned on) the inner surface 405 of the cap 115 and can extend from the inner surface 405 in the second direction 205. The electrode layer stack 110 and the cap 115 can be provided to the first conveyor mechanism 105 by another conveyor device (e.g., a substrate conveyor), a pick-and-place robotic arm, a screw conveyor, or some other conveyance device. The method 1100 can include providing multiple electrode layer stacks 110 to the first conveyor mechanism 105 at regular intervals (e.g., one per second, one per five seconds, one per ten seconds, or at some other interval).

The method 1100 can include providing the housing 135 at ACT 1110. For example, the method 1100 can include providing the housing 135 to the second conveyor mechanism 125 at ACT 1110. The second conveyor mechanism 125 can include a screw 130, where the screw 130 can include at least one supportive surface 165. The housing 135 can be received within the supportive surface 165 of the screw 130. The housing 135 can be received within the supportive surface 165 and between the screw body 133 and the guide 210. The housing 135 can be provided to the second conveyor mechanism 125 with the housing 135 in the first position 145 and in a first orientation. For example, the housing 135 can be in the first position 145 after the housing 135 is provided to the second conveyor mechanism 125. The housing 135 can be in a first orientation after the housing 135 is received by the second conveyor mechanism

125. For example, the housing 135 can be oriented such that a cavity 160 of the housing extends from an open end 155 of the housing 135 in a direction opposite the second direction 205. The housing 135 can be provided to the second conveyor mechanism 125 by another conveyor device (e.g., a substrate conveyor), a pick-and-place robotic arm, a screw conveyor, or some other conveyance device. The method 1100 can include providing multiple housings 135 to the second conveyor mechanism 125 at regular intervals (e.g., one per second, one per five seconds, one per ten seconds, or at some other interval).

The method 1100 can include moving the electrode layer stack 110 at ACT 1115. For example, the method 1100 can include moving the electrode layer stack 110 in the first direction 120 via the first conveyor mechanism 105. The first conveyor mechanism 105 can be a screw-type conveyor mechanism or some other conveyance device (e.g., a substrate conveyor). The first conveyor mechanism 105 can move the electrode layer stack 110 and the cap 115 upon which the electrode layer stack 110 is positioned in the first direction 120. The electrode layer stack 110 and the cap 115 can travel linearly in the first direction 120 such that any movement in a direction other than the first direction 120 is substantially reduced (e.g., 98% reduced). The method 1100 can include moving the electrode layer stack 110, the cap 115, and a fixture 415 in the first direction 120 at ACT 1115. The first conveyor mechanism 105 can move the electrode layer stack 110 in the first direction 120 at a first rate such that the electrode layer stack 110 is positioned to be inserted into the cavity 160 of the housing 135 at an appropriate time (e.g., when the housing 135 is in a second position 150).

The method 1100 can include moving the housing 135 at ACT 1120. For example, the method 1100 can include moving the housing 135 via the second conveyor mechanism 125 along the path 140. The path 140 can be a helical path, arcuate path, or curved path from the first position 145 to the second position 150. The screw 130 of the second conveyor mechanism 125 can move the housing 135 along the path 140. For example, the housing 135 can move within a supportive surface 165 of the screw 130 along the path 140. At least one land 315 of the screw 130 can contact the housing 135 to cause the housing 135 to move in the first direction 120. The housing 135 can contact a guide 210 positioned around the screw 130, where the guide 210 causes the housing 135 to rotate about the screw 130 as the housing 135 is translated by the screw 130. For example, the housing 135 can move along the path 140 via the second conveyor mechanism 125 due to contact between the housing 135 and the land 315 or the guide 210. The second conveyor mechanism 125 can move the housing 135 to the second position 150. The cavity 160 of the housing 135 can extend from the open end 155 of the housing 135 in the second direction 205 with the housing 135 in the second position 150.

The method 1100 can include covering the electrode layer stack 110 at ACT 1125. For example, the method 1100 can include covering the electrode layer stack 110 with the housing 135 at ACT 1125. The second conveyor mechanism 125 can provide the housing 135 over the electrode layer stack 110. For example, the first conveyor mechanism 105 can move the electrode layer stack 110 in the first direction 120 at the first rate while the second conveyor mechanism 125 moves the housing 135 along the path 140 to the second position 150 at the first rate. The housing 135 can include the cavity 160 extending from the open end 155 of the housing 135 with the housing 135 in the second position 150, while the electrode layer stack 110 can extend from the inner surface 405 of the cap 115 proximate to the second position 150 of the housing 135. The electrode layer stack 110 can be inserted into the cavity 160 of the housing 135 without the electrode layer stack 110 contacting (e.g., touching, scraping, rubbing, colliding with) the housing 135. The housing 135 can be provided over the electrode layer stack 110 to encapsulate the electrode layer stack 110 within the cavity 160.

The method 1100 can include securing the housing 135 at ACT 1130. For example, the method 1100 can include securing the housing 135 to the cap 115 at ACT 1130. The open end 155 of the housing 135 can be secured to the cap 115 with the electrode layer stack 110 extending into the cavity 160 of the housing 135. For example, the cap 115 can include an interfacing mechanism 410 that can correspond with an interfacing mechanism of the open end 155. For example, the open end 155 can include a lip or protrusion that can interact with an interfacing mechanism 410 that includes a perimetral groove. The housing 135 can contact the cap 115 with a force (e.g., a force imparted by virtue of the movement of the housing 135 from the first position 145 to the second position 150), where the force can secure the housing 135 to the cap 115. The cap 115 can be detachably coupled with the housing 135 with the housing 135 secured to the cap 115 at ACT 1130.

The method 1100 can include welding the housing 135 at ACT 1135. For example, the method 1100 can include welding the housing 135 to the cap 115 at ACT 1135 to permanently secure the housing 135 to the cap 115. With the housing 135 secured to the cap 115 at ACT 1130 while the electrode layer stack 110 extends into the cavity 160 of the housing 135, a welding device 190 can weld the cap 115 and the housing 135 together to permanently encapsulate the electrode layer stack 110 within the cavity 160 of the housing 135. The welding device 190 can weld the housing 135 and the cap 115 after the first conveyor mechanism 105 moves the housing 135, the cap 115, and the electrode layer stack 110 in the first direction downstream of a location where the housing 135 is secured to the cap 115 at ACT 1130.

Figure 12:
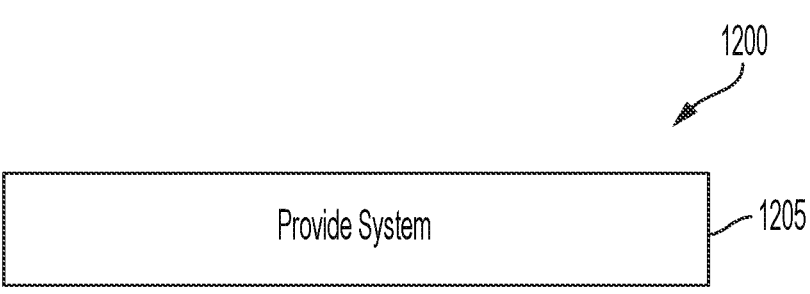
FIG. 12 is a flow chart of an example method of providing a system for manufacturing a battery cell, in accordance with some aspects.

FIG. 12 depicts an example method 1200 of providing a system at ACT 1205. For example, the method 1200 can include providing a system 100 to manufacture a battery cell 185 at ACT 1205. For example, the system 100 can assemble a battery cell 185. The system 100 can include the first conveyor mechanism 105 and the second conveyor mechanism 125. The first conveyor mechanism 105 can receive the electrode layer stack 110 and the cap 115. The first conveyor mechanism 105 can move the electrode layer stack 110 and the cap 115 in the first direction 120 as the electrode layer stack 110 abuts (e.g., be positioned on) the cap 115 and extends from the cap 115 in the second direction 205. The second conveyor mechanism 125 can include the screw 130. The second conveyor mechanism 125 can receive the housing 135. The housing can define the cavity 160. The second conveyor mechanism 125 can move the housing from the first position 145 to the second position 150 via the screw 130. The second conveyor mechanism 125 can rotate the housing 135 about the screw 130 as the housing 135 is moved from the first position 145 to the second position 150. For example, the second conveyor mechanism 125 can move the housing 135 along the path 140 from the first position 145 to the second position 150. The cavity 160 of the housing 135 can extend from the open end 155 in the second direction 205 with the housing 135 in the second position 150. The second conveyor mechanism 125 can provide the housing 135 over the electrode layer stack 110.

The second conveyor mechanism 125 can secure the housing 135 to the cap 115 to assemble the battery cell 185.

Figure 13:
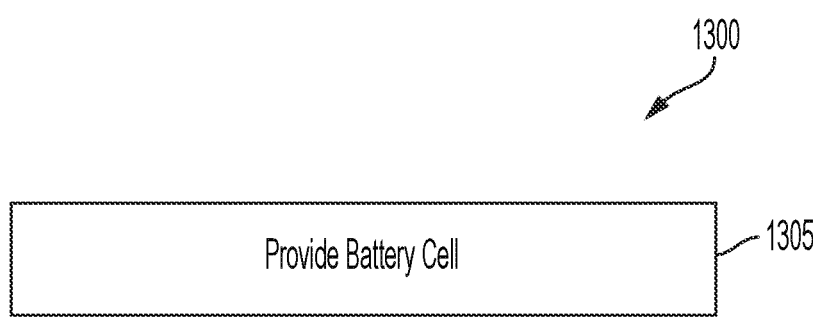
FIG. 13 is a flow chart of an example method of providing a battery cell, in accordance with some aspects.

FIG. 13 depicts an example method 1300 of providing a battery cell at ACT 1305. For example, the method 1300 can include providing the battery cell 185 that has been manufactured or assembled via the system 100 at ACT 1305. The battery cell 185 can be manufactured or assembled by providing the electrode layer stack 110 to the first conveyor mechanism 105. The electrode layer stack 110 can be positioned on (e.g., abut) and extend from the cap 115 in the second direction 205. The battery cell 185 can be manufactured or assembled by providing the housing 135 to the second conveyor mechanism 125. The housing 135 can be received by the second conveyor mechanism 125 in the first position 145 and the first orientation. The housing 135 can define the cavity 160 extending from the open end 155. The battery cell 185 can be manufactured or assembled by moving the electrode layer stack 110 in the first direction 120. The battery cell 185 can be manufactured or assembled by moving the housing 135 from the first position 145 to the second position 150 via the screw 130. The second conveyor mechanism 125 can rotate the housing 135 about the screw 130 along the path 140 as the housing 135 moves from the first position 145 to the second position 150. The battery cell 185 can be manufactured or assembled by covering the electrode layer stack 110 with the housing 135. For example, the second conveyor mechanism 125 can provide the housing 135 over the electrode layer stack 110 with the housing 135 in the second position 150. The cavity 160 of the housing 135 can extend from the open end 155 in the second direction 205. The battery cell 185 can be manufactured or assembled by securing the housing 135 to the cap 115. For example, the second conveyor mechanism 125 can move the housing 135 from the first position 145 to the second position 150, where the movement of the housing 135 imparts a force on the cap 115 as the housing 135 contacts the cap 115. The force can cause the cap 115 to be secured with the housing 135. The battery cell 185 can be manufactured or assembled by welding the housing 135 to the cap 115 via the welding device 190.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system to assemble a battery cell, comprising:
a first conveyor mechanism to move an electrode layer stack and a cap in a first direction, the electrode layer stack abutting the cap and extending from the cap in a second direction; and
a second conveyor mechanism including a screw extending in the first direction, the second conveyor mechanism to receive a housing, rotate the screw to convey the housing about the screw, and provide the housing over the electrode layer stack.

2. The system of claim 1, comprising:
the screw of the second conveyor mechanism defining a supportive surface that corresponds to a form factor of the housing and receives the housing to move the housing in the first direction.

3. The system of claim 1, comprising:
the screw of the second conveyor mechanism defining a supportive surface that corresponds to a form factor of the housing;
wherein the second conveyor mechanism rotates the housing via the screw from a first position to a second position, wherein the housing receives the electrode layer stack in the second position.

4. The system of claim 1, comprising:
the housing including a cavity and an open end to access the cavity;
wherein the second conveyor mechanism rotates the housing from a first position to a second position, wherein the cavity extends from the open end in the second direction to receive the electrode layer stack with the housing in the second position.

5. The system of claim 1, comprising:
the housing including a cavity, an open end to access the cavity, and a form factor; and
the screw defining a supportive surface that corresponds to the form factor of the housing;
wherein the second conveyor mechanism rotates the housing via the screw from a first position to a second position, wherein the cavity extends from the open end in the second direction to receive the electrode layer stack with the housing in the second position.

6. The system of claim 1, wherein the screw is a first screw, the system comprising:
the first screw defining a supportive surface that corresponds to a form factor of the housing; and
the second conveyor mechanism including a second screw defining a second supportive surface that corresponds to the form factor of the housing, the first screw and the second screw to move the housing in the first direction.

7. The system of claim 1, comprising:
the screw including a screw diameter and a screw pitch; and
the second conveyor mechanism including a guide positioned around the screw, the guide defining a guide diameter that is greater than the screw diameter and a guide pitch that is greater than the screw pitch.

8. The system of claim 1, comprising:

the screw including a screw diameter and a screw pitch;

the second conveyor mechanism including a guide positioned around the screw, the guide defining a guide diameter that is greater than the screw diameter and a guide pitch that is greater than the screw pitch; and the second conveyor mechanism to move the housing between the screw and the guide along a helical path in the first direction.

9. The system of claim 1, comprising:

the housing including a cavity, an open end to access the cavity, and a form factor;

the screw defining a supportive surface that corresponds to the form factor of the housing, a screw diameter, and a screw pitch;

the second conveyor mechanism including a guide positioned around the screw, the guide defining a guide diameter that is greater than the screw diameter and a guide pitch that is greater than the screw pitch; and the second conveyor mechanism to move the housing between the screw and the guide along a helical path in the first direction to rotate the housing from a first position to a second position, wherein the cavity extends from the open end in the second direction to receive the electrode layer stack with the housing in the second position.

10. The system of claim 1, comprising:

a fixture coupled with the first conveyor mechanism, the fixture to receive the cap and the electrode layer stack and to move the cap and the electrode layer stack in the first direction via the first conveyor mechanism.

11. The system of claim 1, comprising:

the first conveyor mechanism including at least one screw defining a supportive surface corresponding to the cap or the electrode layer stack and configured to move the cap and the electrode layer stack in the first direction.

12. The system of claim 1, wherein the screw is a first screw, the system comprising:

the first screw of the second conveyor mechanism defining a first supportive surface that corresponds to a form factor of the housing and receives the housing to move the housing in the first direction at a first rate; and the first conveyor mechanism including a second screw, the second screw including a second supportive surface corresponding to a form factor of the cap or the electrode layer stack and configured to receive the cap or the electrode layer stack to move the cap and the electrode layer stack in the first direction at the first rate.

13. The system of claim 1, wherein the screw is a first screw, the system comprising:

the first screw of the second conveyor mechanism including a first supportive surface that corresponds to a form factor of the housing, a first screw diameter, and a first screw pitch;

the first conveyor mechanism including a second screw, the second screw including a second supportive surface corresponding to the cap or the electrode layer stack and configured to move the cap and the electrode layer stack in the first direction at a first rate;

the second conveyor mechanism including a guide positioned around the first screw, the guide defining a guide diameter that is greater than the first screw diameter and a guide pitch that is greater than the first screw pitch; and the second conveyor mechanism to move the housing between the screw and the guide along a helical path in the first direction at the first rate.

14. The system of claim 1, wherein the screw is a first screw, the system comprising:

the housing including a cavity, an open end to access the cavity, and a form factor;

the first screw of the second conveyor mechanism including a first supportive surface that corresponds to the form factor of the housing, a first screw diameter, and a first screw pitch;

the first conveyor mechanism including a second screw, the second screw including a second supportive surface corresponding to the cap or the electrode layer stack and configured to move the cap and the electrode layer stack in the first direction at a first rate;

the second conveyor mechanism including a guide positioned around the first screw, the guide defining a guide diameter that is greater than the first screw diameter and a guide pitch that is greater than the first screw pitch;

the second conveyor mechanism to move the housing between the screw and the guide along a helical path in the first direction at the first rate to rotate the housing from a first position to a second position, wherein the cavity extends from the open end in the second direction to receive the electrode layer stack with the housing in the second position; and the second conveyor mechanism to secure the cap to the open end of the housing.

15. A method, comprising:

moving, via a first conveyor mechanism, an electrode layer stack and a cap in a first direction, the electrode layer stack extending from the cap in a second direction;

moving, via a second conveyor mechanism, a housing from a first position to a second position, the housing including a cavity extending from an open end, the second conveyor mechanism including a screw extending in the first direction, the second conveyor mechanism to receive the housing and rotate the housing about the screw to convey the housing in the first direction and provide the housing over the electrode layer stack; and securing, via the second conveyor mechanism, the open end to the cap with the electrode layer stack within the cavity and with the cavity extending from the open end in the second direction.

16. The method of claim 15, wherein the second conveyor mechanism includes the screw to move the housing from the first position to the second position along a helical path extending in the first direction.

17. The method of claim 15, wherein the screw is a first screw, wherein the first conveyor mechanism includes a second screw to move the electrode layer stack and the cap in the first direction at a first rate;

wherein the second conveyor mechanism includes the first screw to move the housing from the first position to the second position along a helical path extending in the first direction at the first rate.

18. The method of claim 15, wherein the screw is a first screw, wherein the first conveyor mechanism includes a second screw to move the electrode layer stack and the cap in the first direction at a first rate;

wherein the second conveyor mechanism includes a guide positioned around the first screw, the first screw including a first screw diameter and a first screw pitch, the guide including a guide diameter that is greater than the first screw diameter and a guide pitch that is greater than the first screw pitch, the second conveyor mechanism to move the housing from the first position to the second position along a helical path extending in the first direction at the first rate between the first screw and the guide.

19. An electric vehicle, comprising:

a battery cell comprising an electrode layer stack within a housing, the battery cell produced by:

moving, via a first conveyor mechanism, the electrode layer stack and a cap in a first direction, the electrode layer stack extending from the cap in a second direction;

moving, via a second conveyor mechanism, the housing from a first position to a second position, the housing including a cavity extending from an open end, the second conveyor mechanism including a screw extending in the first direction, the second conveyor mechanism to receive the housing and rotate the housing about the screw to convey the housing in the first direction and to provide the housing over the electrode layer stack; and securing, via the second conveyor mechanism, the open end to the cap with the electrode layer stack within the cavity and with the cavity extending from the open end in the second direction.

20. The electric vehicle of claim 19, wherein the screw is a first screw, wherein the first conveyor mechanism includes a second screw to move the electrode layer stack and the cap in the first direction at a first rate;

wherein the second conveyor mechanism includes a guide positioned around the first screw, the first screw including a first screw diameter and a first screw pitch, the guide including a guide diameter that is greater than the first screw diameter and a guide pitch that is greater than the first screw pitch, the second conveyor mechanism to move the housing from the first position to the second position along a helical path extending in the first direction at the first rate between the first screw and the guide.

\* \* \* \* \*